United States Patent
Jang et al.

(10) Patent No.: US 10,560,188 B2
(45) Date of Patent: Feb. 11, 2020

(54) IMAGE SENSOR COMMUNICATION SYSTEM AND COMMUNICATION METHOD USING ROLLING SHUTTER MODULATION

(71) Applicant: KOOKMIN UNIVERSITY INDUSTRY ACADEMY COOPERATION FOUNDATION, Seoul (KR)

(72) Inventors: Yeong Min Jang, Seoul (KR); Van Nguyen Trang, Seoul (KR); Chang Hyun Hong, Goyang-si (KR)

(73) Assignee: KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 0 days.

(21) Appl. No.: 15/551,561

(22) PCT Filed: Jan. 15, 2016

(86) PCT No.: PCT/KR2016/000482
§ 371 (c)(1),
(2) Date: Dec. 12, 2017

(87) PCT Pub. No.: WO2016/133285
PCT Pub. Date: Aug. 25, 2016

(65) Prior Publication Data
US 2018/0159624 A1 Jun. 7, 2018

(30) Foreign Application Priority Data

Feb. 17, 2015 (KR) .................... 10-2015-0024036
May 20, 2015 (KR) .................... 10-2015-0070608

(Continued)

(51) Int. Cl.
*H04B 10/00* (2013.01)
*H04B 10/06* (2006.01)
(Continued)

(52) U.S. Cl.
CPC ....... *H04B 10/116* (2013.01); *H04B 10/5563* (2013.01); *H04B 10/676* (2013.01); *H04N 5/3532* (2013.01)

(58) Field of Classification Search
CPC .................................................. H04B 10/116
(Continued)

(56) References Cited

U.S. PATENT DOCUMENTS 6,300,871 B1 * 10/2001 Irwin ..................... G01K 1/024
340/506
6,556,550 B1 * 4/2003 Rasanen .................. H04J 3/06
370/329

(Continued)

FOREIGN PATENT DOCUMENTS

JP 2014-212504 A 11/2014
JP 2014-220791 A 11/2014
(Continued)

Primary Examiner — David C Payne
Assistant Examiner — Pranesh K Barua
(74) Attorney, Agent, or Firm — Novick, Kim & Lee, PLLC; Sang Ho Lee

(57) ABSTRACT

The present invention relates to an image sensor communication (ISC) system and method for enabling communication between an LED and a rolling shutter camera using a rolling shutter modulation method. The image sensor communication system according to an embodiment of the present invention comprises: a coding unit for coding transmission data to be transmitted; an LED which is turned on/off according to the transmission data coded in the coding unit; a rolling shutter camera for continuously photographing, at each of a plurality of rows in a rolling shutter manner, on/off images according to the on/off of the LED; an image (Continued)

processing unit for generating brightness signals according to brightness values of the on/off images of the LED photographed at each of the plurality of rows by the rolling shutter camera; and a data extraction unit for extracting the transmission data from the brightness signals of the on/off images of the LED generated by the image processing unit.

12 Claims, 27 Drawing Sheets

(30) Foreign Application Priority Data

| | | |
|---|---|---|
| May 21, 2015 | (KR) | 10-2015-0071109 |
| Oct. 6, 2015 | (KR) | 10-2015-0140416 |
| Jan. 11, 2016 | (KR) | 10-2016-0003125 |
| Jan. 11, 2016 | (KR) | 10-2016-0003128 |
| Jan. 12, 2016 | (KR) | 10-2016-0003866 |
| Jan. 12, 2016 | (KR) | 10-2016-0003871 |
| Jan. 12, 2016 | (KR) | 10-2016-0003874 |

(51) Int. Cl.
*H04B 10/116* (2013.01)
*H04B 10/67* (2013.01)
*H04N 5/353* (2011.01)
*H04B 10/556* (2013.01)

(58) Field of Classification Search
USPC .................. 398/130, 208, 135; 370/474
See application file for complete search history.

(56) References Cited

U.S. PATENT DOCUMENTS

| | | | | |
|---|---|---|---|---|
| 8,428,469 | B2* | 4/2013 | Kim | H04B 10/116 398/127 |
| 8,873,965 | B2* | 10/2014 | Giustiniano | H04B 10/116 398/118 |
| 9,065,562 | B2* | 6/2015 | Kim | H04B 10/116 |
| 2004/0037246 | A1* | 2/2004 | Grilli | H04L 1/0045 370/331 |
| 2010/0158523 | A1* | 6/2010 | Han | H04J 14/0282 398/68 |
| 2010/0172651 | A1* | 7/2010 | Nien | H04B 10/1141 398/135 |
| 2010/0215380 | A1* | 8/2010 | Aoyama | H04B 10/11 398/208 |
| 2011/0069957 | A1* | 3/2011 | Kim | H04B 3/542 398/75 |
| 2011/0069965 | A1* | 3/2011 | Kim | H04B 10/1149 398/130 |
| 2011/0150001 | A1* | 6/2011 | Song | H04W 4/06 370/474 |
| 2011/0293288 | A1* | 12/2011 | Ogushi | H04L 1/0045 398/154 |
| 2012/0163279 | A1* | 6/2012 | Tran | H04Q 9/00 370/312 |
| 2012/0243561 | A1* | 9/2012 | Loghin | H04L 1/0006 370/537 |
| 2013/0266325 | A1* | 10/2013 | Giustiniano | H04B 10/116 398/130 |
| 2013/0294782 | A1* | 11/2013 | Liboiron-Ladouceur | H04B 10/616 398/202 |
| 2013/0308954 | A1* | 11/2013 | Lee | H03M 13/005 398/118 |
| 2014/0003817 | A1* | 1/2014 | Roberts | H04B 10/11 398/74 |
| 2014/0092945 | A1* | 4/2014 | Shenoy | H04L 25/062 375/224 |
| 2014/0093249 | A1* | 4/2014 | Roberts | G01C 21/165 398/127 |
| 2014/0207517 | A1* | 7/2014 | Oshima | H04N 5/2356 705/7.29 |
| 2014/0270796 | A1* | 9/2014 | Jovicic | H04B 10/1141 398/128 |
| 2014/0286644 | A1* | 9/2014 | Oshima | H04B 10/11 398/118 |
| 2015/0002731 | A1 | 1/2015 | Raskar et al. | |
| 2015/0028763 | A1 | 1/2015 | Feri et al. | |
| 2015/0104185 | A1* | 4/2015 | Breuer | G01C 3/08 398/131 |
| 2016/0037240 | A1* | 2/2016 | Yang | H04Q 11/0005 398/45 |
| 2016/0191158 | A1* | 6/2016 | Aoyama | H04B 10/1149 398/172 |
| 2016/0226594 | A1* | 8/2016 | Haas | H04B 10/516 |
| 2017/0237488 | A1* | 8/2017 | Aoyama | H04B 10/50 398/118 |
| 2017/0264364 | A1* | 9/2017 | Aoyama | G08C 23/04 |
| 2017/0310743 | A1* | 10/2017 | Aoyama | H04L 67/1006 |

FOREIGN PATENT DOCUMENTS

| | | |
|---|---|---|
| KR | 10-1990-0701115 A | 8/1990 |
| KR | 10-2004-0089744 A | 10/2004 |
| KR | 10-2009-0044970 A | 5/2009 |
| KR | 10-1466954 B1 | 12/2014 |
| KR | 10-1472583 B1 | 12/2014 |

* cited by examiner

| Baud symbol | Frequency+FSK |
|---|---|
| Start Frame | f0 |
| 00000 | f1 |
| 00001 | f2 |
| 00010 | f3 |
| 00011 | f4 |
| 00100 | f5 |
| 00101 | f6 |
| 00110 | f7 |
| 00111 | f8 |
| ... | ... |
| 11110 | $f_{31}$ |
| 11111 | $f_{32}$ |

IMAGE SENSOR COMMUNICATION SYSTEM AND COMMUNICATION METHOD USING ROLLING SHUTTER MODULATION

TECHNICAL FIELD

The present invention relates to an image sensor communication system and a method thereof, and more specifically, to an image sensor communication system and an image sensor communication method thereof, in which data communication can be performed between an LED as a data transmitter and an image sensor of a rolling shutter method as a data receiver.

BACKGROUND ART

Visible Light Communication (VLC), which is a typical illumination-communication fusion technique, is a technique of wireless communication which loads information on illumination of a light source. Conventionally, this is a technique of receiving light of a light source using a photo diode (PD), detecting digital data of 1 or 0 according to on/off of the light source and transferring information through combination of the digital data.

Conventionally, a visible light communication system is proposed to photograph a plurality of LEDs using a camera, instead of a photo diode, and extract data corresponding to on/off of the LEDs acquired from each frame of the camera. The visible light communication system using a camera like this is also referred to as an Optical Camera Communication (OCC) system since it uses a camera, rather than a photo diode, as an optical receiver, and a standardization work is under progress by the IEEE 802.15.7a study group.

Recently, there is an attempt of applying a rolling shutter camera to such an optical camera communication (OCC) system. The rolling shutter camera uses an electronic shutter employed in an image sensor, which acquires an image of each frame by combining images captured at each row of image sensors arranged in a plurality of rows. Since data transmission can be performed by turning on/off the LEDs in correspondence to a data to be transmitted and restoring the data by analyzing and processing the images captured by the image sensors, it is named as Image Sensor Communication (ISC).

However, in the conventional technique, a technique of extracting a data corresponding to on/off images of a light source of each row using the rolling shutter camera is not clearly presented yet, and since photographing begins at an arbitrary time point when the image sensor communication system photographs on/off images of a light source using the rolling shutter camera, there are occasions in which frames of the rolling shutter camera are not accurately synchronized with on/off timing of the light source. In this case, there is a problem in that it is difficult to extract accurate data.

In addition, although the frame rate of a conventional general rolling shutter camera is fixed to 30 fps, the frame rate actually changes in a range of 20 to 35 fps according to products. Therefore, when the pulse rate of an LED is constant, change of the frame rate of the camera may invite loss of data. For example, if the camera operates when the frame rate of the rolling shutter camera is unstable and changes or when change of the frame rate is unexpected, there is a problem in that data loss may occur since the camera does not photograph an image when the LED is turned on/off between two image frames.

In addition, the conventional technique has a problem in that it is difficult to extract accurate data since the frame of the rolling shutter camera is not synchronized with on/off timing of the light source as the rolling shutter camera begins photographing at an arbitrary time point, and furthermore, since strength of a transmitted signal is weak and on/off images of the LED cannot be clearly distinguished if the distance between the LED, i.e., a transmitter, and the rolling shutter camera, i.e., a receiver, is long, it is difficult to use the image signal strength of LED pixels in long distance transmission.

Furthermore, conventionally, when a plurality of diverse rolling shutter cameras having frame rates and sampling rates different from each other performs image sensor communication, there are occasions in which several rolling shutter cameras do not receive the same data from the same LED.

DISCLOSURE OF INVENTION

Technical Problem

Therefore, the present invention has been made in view of the above problems, and it is an object of the present invention to provide an image sensor communication system using a light source and a rolling shutter camera, which photographs the light source using the rolling shutter camera and extracts data from on/off images of the light source.

Another object of the present invention is to provide an image sensor communication method using an LED and a rolling shutter camera, which can prevent loss of transmitted data although the frame rate of the rolling shutter camera changes.

In addition, still another object of the present invention is to provide an image sensor communication method using an LED and a rolling shutter camera, which can enhance accuracy of data transmission by preventing omission of a frame that occur since a frame of the rolling shutter camera is not synchronized with on/off of the LED, although the rolling shutter camera begins photographing at an arbitrary time point.

Furthermore, an additional object of the present invention is to provide an image sensor communication method of a Frequency Division Modulation (FDM) method based on an LED and a rolling shutter camera, which allows accurate image sensor communication even in long distance transmission between the LED and the rolling shutter camera using a frequency-modulated signal by modulating brightness signals of on/off images of the LED into a frequency domain in an image sensor communication (ISC) system using the LED and the rolling shutter camera.

Technical Solution

To accomplish the above objects, according to one aspect of the present invention, there is provided an image sensor communication system comprising: a data coding unit for encoding a transmission data to be transmitted; an LED turned on/off according to the transmission data coded by the data coding unit; a rolling shutter camera for continuously photographing on/off images according to on/off of the LED at each of a plurality of rows in a rolling shutter method; an image processing unit for generating a brightness signal according to brightness values of the on/off images of the LED photographed at each of the plurality of rows by the rolling shutter camera; and a data extraction unit for extracting the transmission data from the brightness signal of the on/off images of the LED generated by the image processing unit.

According to another aspect of the present invention, there is provided an image sensor communication system comprising: a data coding unit including: a packet segmentation unit for segmenting an input transmission data into a plurality of equal packets, an SF insertion unit for inserting a start frame SF in each of the segmented data packets, an ID insertion unit for inserting identification information ID of an LED in each data packet in which the start frame SF is inserted, a clock signal generation unit for generating a clock signal, an asynchronous symbol insertion unit for inserting an asynchronous symbol, according to the clock signal, in each data packet in which the start frame SF and the identification information ID are inserted, and an M-FSK coding unit for allocating a frequency corresponding to the data packet using a preset multiple frequency shift keying (M-FSK) coding table; at least one LED turned on/off according to the allocated frequency in correspondence to the data packet received from the data coding unit; and a rolling shutter camera including: an image sensor for capturing on/off images of the LED in a rolling shutter method, an M-FSK decoding unit for extracting a data packet corresponding to the allocated frequency using the M-FSK coding table from the on/off images captured by the image sensor, and a transmission data extraction unit for extracting the transmission data from the extracted data packet.

According to another aspect of the present invention, there is provided an image sensor communication method comprising: a coding step of encoding a transmission data to be transmitted and configuring a data frame including the coded transmission data, by a data coding unit; a driving step of turning on/off an LED to correspond to the data frame according to a pulse frequency, by an LED driving unit; a capturing step of capturing on/off images of the LED as a continuous frame image at each of a plurality of rows in a rolling shutter method according to a frame rate, by a rolling shutter camera; a generation step of generating a brightness signal according to brightness values of the on/off images of the LED captured at each of the plurality of rows as a continuous frame image, by an image processing unit; and an extraction step of extracting the transmission data from the brightness signal, by an image extraction unit, wherein a plurality of super-frames distinguished by each transmission data is continuously arranged in the data frame, each of the super-frames includes continuously repeated N data subframes (N is a natural number), and each of the data subframes is configured of a data packet including the coded transmission data, asynchronous bits respectively added at front and rear ends of the data packet and a start frame added at a front end of the front-end asynchronous bit.

Advantageous Effects

According to the present invention, a data corresponding to on/off images according to on/off of a light source can be extracted by applying a rolling shutter camera to an image sensor communication system.

In addition, according to the present invention, if photographing begins at an arbitrary time point when a data is transmitted using a rolling shutter camera, reliability of data transmission can be improved by accurately detecting a start frame.

In addition, according to the present invention, since it is possible to set a range of modulation frequency for driving an LED appropriate to image sensor communication (ISC) using the LED and a rolling shutter camera and effectively restore data, loss of transmitted data can be prevented although the frame rate of the rolling shutter camera changes.

In addition, according to the present invention, since an image sensor communication (ICS) system using an LED and a rolling shutter camera transmits data by modulating a brightness signal of on/off images of the LED in a frequency or phase domain through a frequency division modulation (FDM) method, a phase shift keying (PSK) method or a frequency shift keying (FSK) method, the data can be transmitted without loss although the distance between the LED and the rolling shutter camera is long.

Furthermore, according to the present invention, it is possible to transmit accurate data between the LED and the rolling shutter camera even when the frame rate of the rolling shutter camera changes.

BEST MODE FOR CARRYING OUT THE INVENTION

Figure 1:
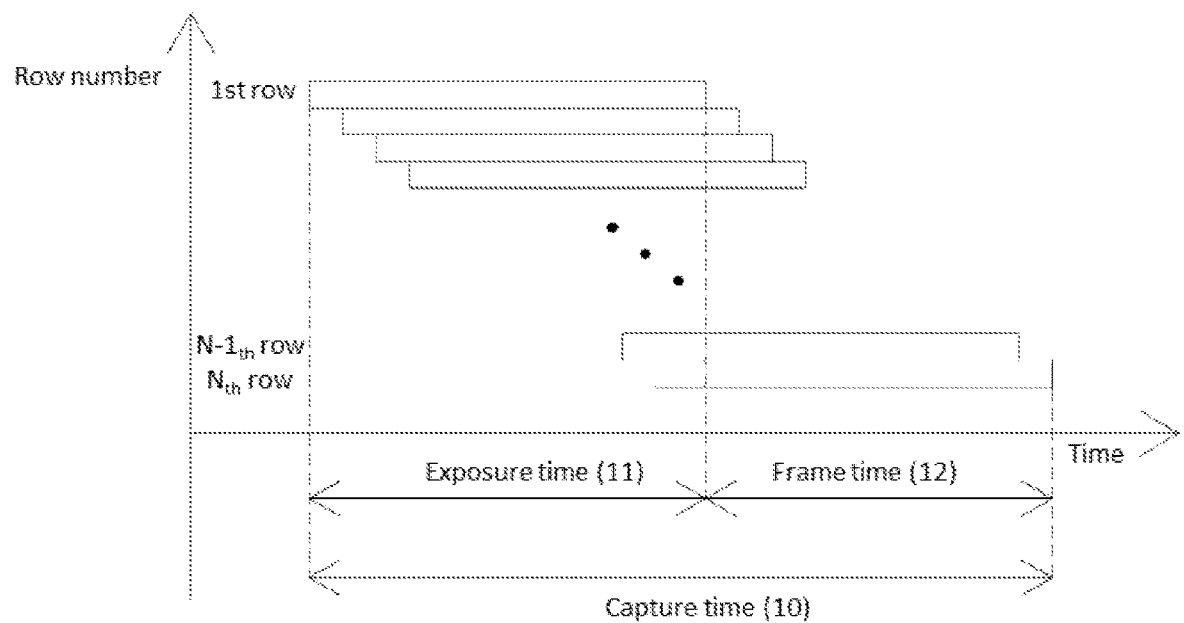
FIG. 1 is a view showing the process of capturing on/off images of a light source in a rolling shutter camera according to the present invention.

Hereafter, some embodiments of the present invention will be described in detail with reference to the accompanying drawings. In assigning reference numerals to elements in the drawings, it should be noted that elements having like functions will be denoted by like reference numerals although the elements are displayed in different drawings. In addition, in describing the embodiments of the present invention, when it is determined that the detailed description of the known art related to the present invention may obscure the gist of the present invention, the detailed description thereof will be omitted.

In addition, in describing the elements of the embodiments of the present invention, the terms such as "first", "second", "A", "B", "(a)", "b" and the like may be used. The terms are only to distinguish an element from the other elements, and the nature, order, sequence or the like of the elements is not limited by these terms. It will be understood that when an element is referred to as being "connected", "bound" or "coupled" to another element, although they may be directly connected or coupled to the other element, intervening elements may be "connected", "bound" or "coupled" between the elements.

FIG. 1 is a view showing the process of capturing on/off images of a light source in a rolling shutter camera according to the present invention.

Referring to FIG. 1, a rolling shutter camera according to the present invention photographs and captures images at each of a plurality of rows during one capture time 10. At this point, photographing images at each row is accomplished in a nonlinear scan method at preset regular time intervals. This is sequentially exposing each row of image sensors (not shown) provided inside the camera for a preset integration time 11, i.e., exposing each row at predetermined time intervals. The time between the last integration time of the first row and the last integration time of the last row is referred to as a frame time 12, and addition of the integration time and the frame time becomes the capture time 10.

Figure 2:
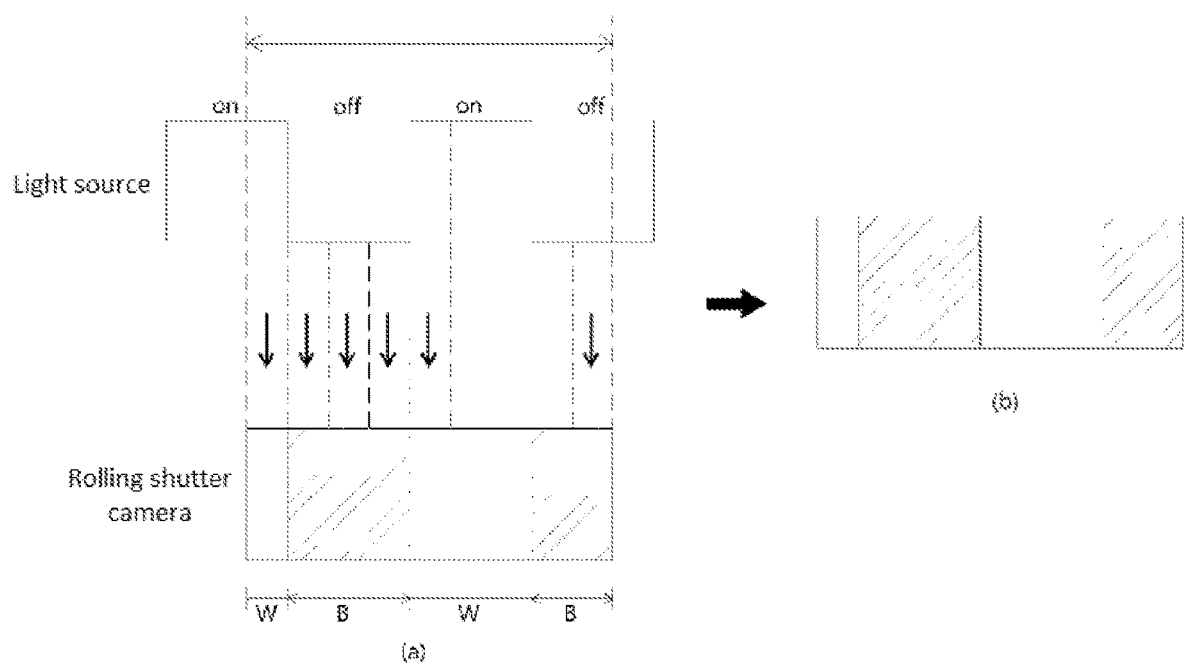
FIG. 2 is an exemplary view showing on/off images of a light source captured by a rolling shutter camera according to the present invention.

FIG. 2 is an exemplary view showing on/off images of an LED captured by a rolling shutter camera according to the present invention.

Referring to FIG. 2, while an LED according to the present invention is turned on/off, the rolling shutter camera photographs the LED. For example, the figure shows an example of capturing on/off images at each of a plurality of rows by the rolling shutter camera while one LED is turned on and off. Referring to the figure, an image captured during the capture time appears in white color W when the LED is turned on and appears in black color B when the LED is turned off. At this point, it should be noted that brightness values of the white color W and the black color B may be different in the process of turning on or off the LED. For example, since the rolling shutter camera photographs at an arbitrary time point, the brightness value may be an intermediate color between the white color W and the black color B when the camera captures an image while the LED changes from an off state to an on state. The image captured like this is as shown FIG. 2(b).

Figure 3:
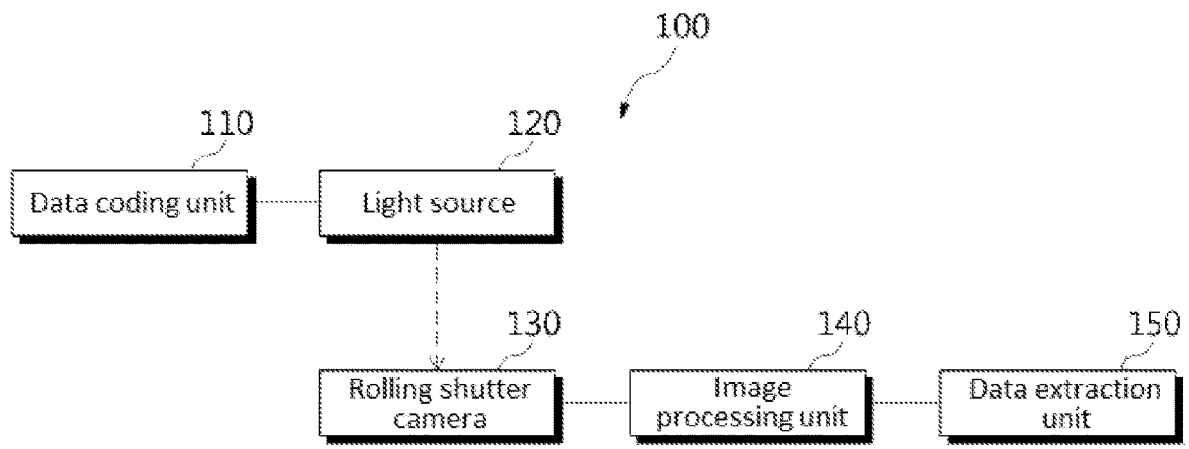
FIG. 3 is a view showing the configuration of an image sensor communication system using a rolling shutter camera according to an embodiment of the present invention.

FIG. 3 is a view showing the configuration of an image sensor communication (ISC) system using a rolling shutter camera according to an embodiment of the present invention.

Referring to FIG. 3, an image sensor communication system 100 using a rolling shutter camera according to the present invention includes a data coding unit 110, an LED 120, a rolling shutter camera 130, an image processing unit 140 and a data extraction unit 150.

The data coding unit 110 encodes a transmission data to be transmitted by the image sensor communication (ISC) system. Such a coding may be implemented in a variety of ways. For example, the LED 120 may be set to on if the transmission data to be transmitted is 1 and set to off if the transmission data is 0. Such an example may be set differently according to the frequency pulse of the LED 120. For example, the LED 120 may be set to on-on if the transmission data to be transmitted is 1 and set to off-off if the transmission data to be transmitted is 0. Like this, in the present invention, the data coding unit 110 may allow the transmission data to be transmitted through on/off of the LED in the future by matching the on/off states of the LED corresponding to the transmission data.

The LED 120 performs a function of a transmitter in the image sensor communication system. At least one or more LEDs 120 are provided, and the LEDs 120 are turned on or off at a preset pulse rate according to the transmission data coded by the data coding unit 110. When the LED 120 is provided in plurality according to embodiments, the LEDs 120 may be arranged in an array of 1×N, M×1 or preferably M×N. Of course, they may be arranged in various forms, such as a circular shape, a radial shape, an oval shape and the like. If the pulse rate of turning on/off the LED 110 is one hundred and ten or more per second, on/off cannot be distinguished by human eyes and is recognized as being continuously turned on. Of course, the pulse rate may be adjusted.

The rolling shutter camera 130 performs a function of a receiver in the image sensor communication system. The rolling shutter camera 130 captures on/off images of the LED 120 at each of a plurality of rows in a rolling shutter method. To this end, image sensors for capturing the images in a rolling shutter method are provided inside the rolling shutter camera 130, and rows of the image sensors are sequentially exposed. Output of an exposed row appears in the shape of white band when the LED 120 is in an on state, and black color appears in the shape of a black band when the LED 120 is in an off state. At this point, the white band and the black band are data and set to express '1' and '0'. Like this, it is possible to receive multiple data in a frame. A CMOS sensor, for example, may be used as the image sensor described above. At this point, the rolling shutter camera 130 may begin photographing at an arbitrary time point while the LED 120 is turned on or off. In this case, a start frame and a data frame need to be distinguished from the captured image. This will be described below in detail. In this embodiment, the rolling shutter camera 130 may include a digital camera and a camera mounted on a cellular phone, a smart device or the like.

The image processing unit 140 generates a brightness signal according to brightness values of the on/off images of the LED 120 photographed at each of the plurality of rows by the rolling shutter camera 130. Specifically, each of the plurality of rows appears as a white band and a black band in the process of turning on or off the LED 120 as described above, and a brightness value of each band may appear differently. That is, a color appearing according to on/off of the LED 120 may be expressed as a brightness value of, for example, 0 to 255. For example, the white band may express a brightness value of 255, and the black band may express a brightness value of 0. Of course, a range of the brightness values may be changed. In addition, since the rolling shutter camera 130 may photograph at an arbitrary time point as described above, the brightness value may be a band of an intermediate color between the white band and the black band when a row is captured while the LED 120 changes from an off state to an on state. This may be expressed as a brightness value between 0 and 255. Therefore, the image processing unit 140 generates a brightness signal of each row corresponding to the brightness value of each band according to the on/off images of the LED 120 photographed at each row. At this point, since the LED 120 is continuously turned on or off according to a preset frequency pulse, the brightness signal of the on/off images has a continuous value at each row.

The data extraction unit 150 extracts a transmission data from the brightness signal of the on/off images of the LED 120 generated by the image processing unit 140. This is restoring the transmission data coded in the on/off images of the LED 120 by the data coding unit 110. For example, when the data coding unit 110 sets the LED 120 to correspond to on if the transmission data to be transmitted is 1 and sets the LED 120 to correspond to off if the transmission data is 0, the data extraction unit 150 extracts 1 from an on image of the LED 120 and extracts 0 from an off image. At this point, in the present invention, the transmission data is extracted from the brightness signal of the on/off images of the LED 120 using the brightness values. Specifically, the transmission data is extracted by combining slopes of the brightness signal, i.e., risings and fallings of the brightness signal.

Figure 4:
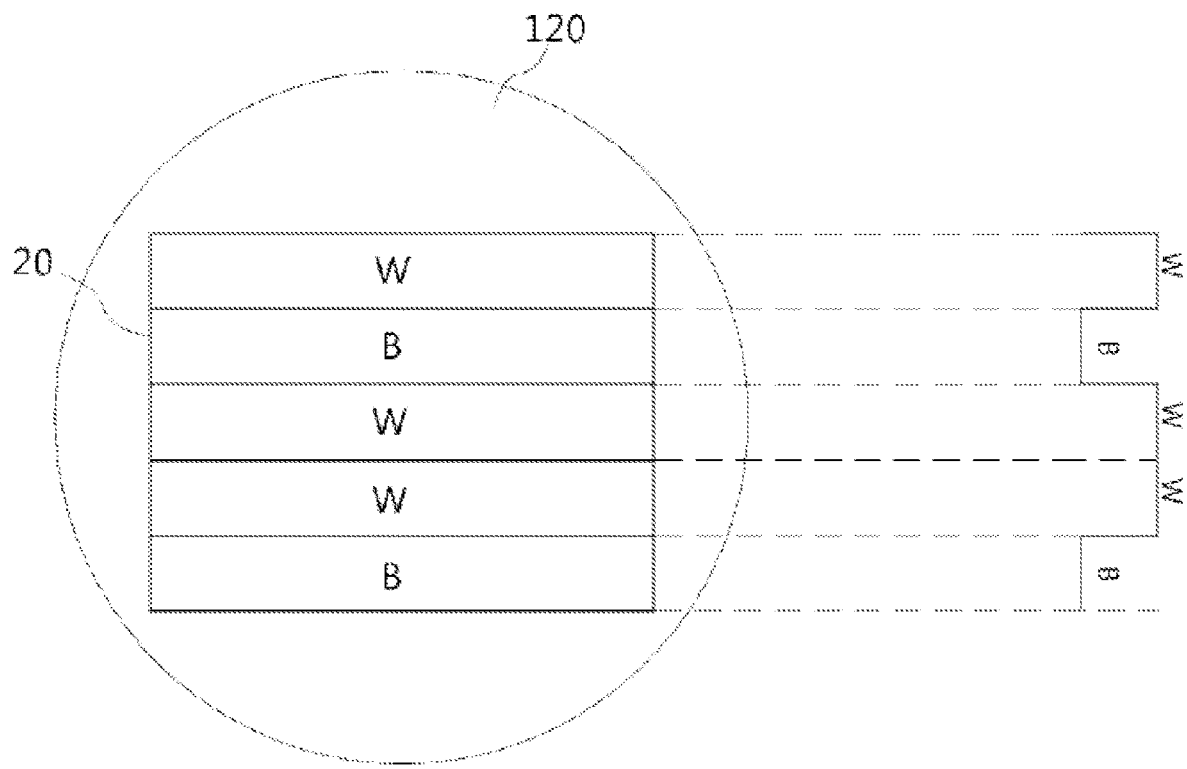
FIG. 4 is a view showing the principle of generating a brightness signal by an image processing unit according to an embodiment of the present invention.

FIG. 4 is a view showing the principle of generating a brightness signal by an image processing unit according to an embodiment of the present invention.

FIG. 4 is an exemplary view showing a case in which the entire screen 20 of the rolling shutter camera 130 is smaller than the LED 120. Of course, it is natural that the entire screen 20 may be larger than the LED 120. In the example as shown in FIG. 4, the rolling shutter camera 130 captures an image as a white band W or a black band B at each of a plurality of rows. In the figure, five rows are shown as an example, and an example of capturing bands of W, B, W, W and B is shown. At this point, since W is a white band, the brightness value is, for example, 255, and since B is a black band, the brightness value is, for example, 0. These brightness values may be set differently. Accordingly, a brightness signal corresponding to a brightness value may be generated in a form as shown on the right side of the figure. Here, the brightness signal shown on the right side describes an ideal case and has an arbitrary value between 0 and 255 while the LED 120 is turned on and off. For example, when an image is photographed at an arbitrary row while the LED 120 changes from an on state to an off state, the brightness signal may have a brightness value of, for example, 175. This is expressed as an intermediate color between the white color and the black color. If the brightness signal according to the brightness value is shown for each row, it can be expressed as shown in FIGS. 5 and 6.

Figure 5:
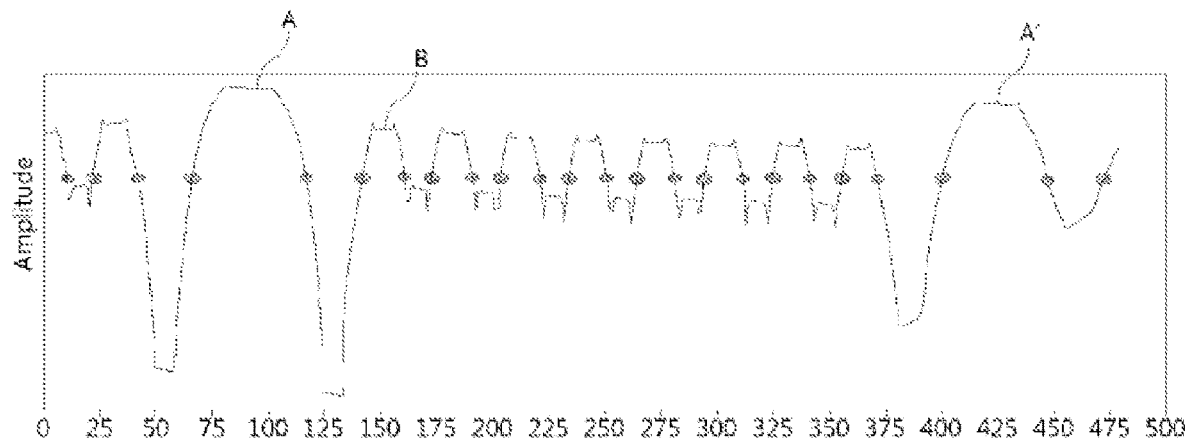
FIG. 5 is a view showing the process of extracting a transmission data from a brightness signal of on/off images of a light source according to an embodiment of the present invention.
Figure 6:
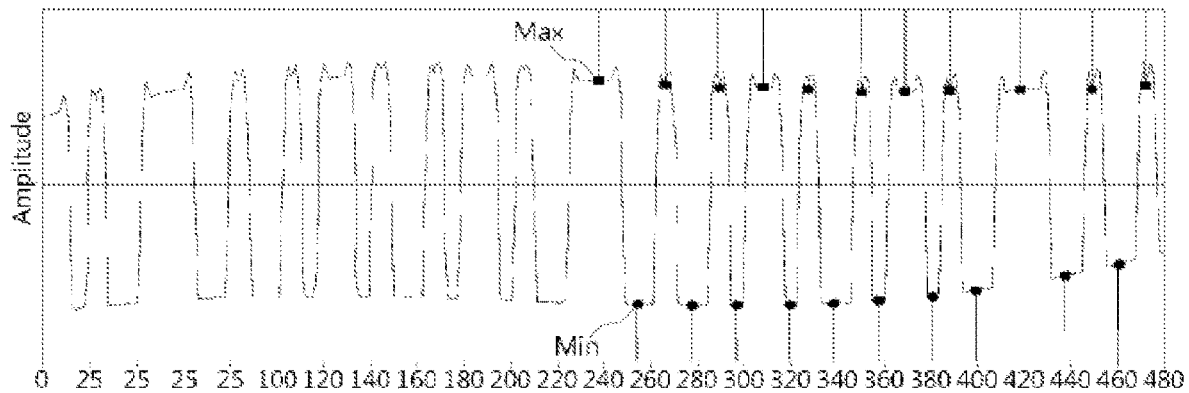
FIG. 6 is a view showing the process of extracting a transmission data from a brightness signal of on/off images of a light source according to another embodiment of the present invention.

FIG. 5 is a view showing the process of extracting a transmission data from a brightness signal of on/off images of an LED according to an embodiment of the present invention, and FIG. 6 is a view showing the process of extracting a transmission data from a brightness signal of on/off images of an LED according to another embodiment of the present invention.

In the brightness signals shown in FIGS. 5 and 6, the horizontal axis represents rows, and the vertical axis represents relative values of brightness values. For example, when the white band is set to 255 and the black band is set to 0, the larger the relative value in the vertical axis, the brightness value is close to the white band, i.e., 255, and the smaller the relative value, the brightness value is close to the black band, i.e., 0. If brightness values of on/off images of the LED 120 are determined for each row like this, the image processing unit 140 generates a brightness signal of each row from the brightness values as shown in FIGS. 5 and 6. In FIG. 5, in order to distinguish a start frame SF and a transmission data using on/off time of the LED 120 while the LED 120 is turned on/off, an on or off time interval of the LED 120 for the start frame and an on or off time interval of the LED 120 for the transmission data are set to be different from each other. For example, in FIG. 5, on time of the start frame A is set to be relatively long, and on time of the transmission data B is set to be relatively short. Of course, the relative time length may be set in an opposite manner. The difference between the time intervals of the start frame A and the transmission data B is to distinguish a starting point of the transmission data while the LED 120 is continuously turned on and off. Accordingly, in FIG. 5, it is determined that the brightness signal existing between a first start frame A and a next second start frame A' corresponds to a transmission data, and the transmission data is extracted from the corresponding brightness signal. At this point, the data extraction unit 140 extracts the transmission data from the brightness signal generated at each of the plurality of rows using a slope of the brightness signal at the same brightness value previously set for each of a plurality of rows. Specifically, the transmission data is extracted by combining risings and fallings of the brightness signal at the same preset brightness value. For example, in FIG. 5, a brightness value at the positions of red dots and green dots is set, and a slope of the brightness signal at a corresponding brightness value is such that the slope value has a positive (+) value at a red dot and a negative (−) value at a green dot. At this point, if the (+) slope value at the red dot and the (−) slope value at the continued next green dot are combined at a preset brightness value, transmission data of some rows can be extracted. For example, the brightness signal at B forms a white band at the 140 to 160-th rows. It is understood that the LED 120 is turned on at the 140 to 160-th rows. In addition, since the 160 to 175-th rows are a falling section of the brightness signal, the images are photographed at the corresponding rows while the LED 120 changes from an on state to an off state. Like this, if there exist a section of rising slope of the brightness signal at a preset brightness value and a falling section continued after the rising section in the brightness signal of the on/off images of the LED 120, the data extraction unit 140 knows that there exists a case in which the LED 120 is turned on by combining these two sections and extracts a transmission data therefrom. At this point, the preset brightness value is determined as a brightness value at the brightness signal. That is, if the brightness value is set too high or too low, there may be a section in which the brightness value exists. When the red dots and the green dots shown in FIG. 5 are set to correspond to a brightness signal, it is preferable to set a brightness value that may correspond to all brightness signals.

In addition, in FIG. 6, the data extraction unit 150 extracts a transmission data from the brightness signal generated at each of a plurality of rows by combining a maximum brightness value Max and a minimum brightness value Min of each of the plurality of rows. That is, the data extraction unit 150 may extract the transmission data by combining a section in which the brightness value is the largest Max and a section appearing thereafter in which the brightness value is the smallest Min in the brightness signal appearing after a start frame. That is, if a maximum value Max of the brightness value appears and a minimum value Min comes thereafter, a transmission data, for example 1, may be extracted from these two values. Contrarily, it may be set to extract a transmission data 0 if a maximum value Max appears after a minimum value Min of the brightness value.

Figure 7:
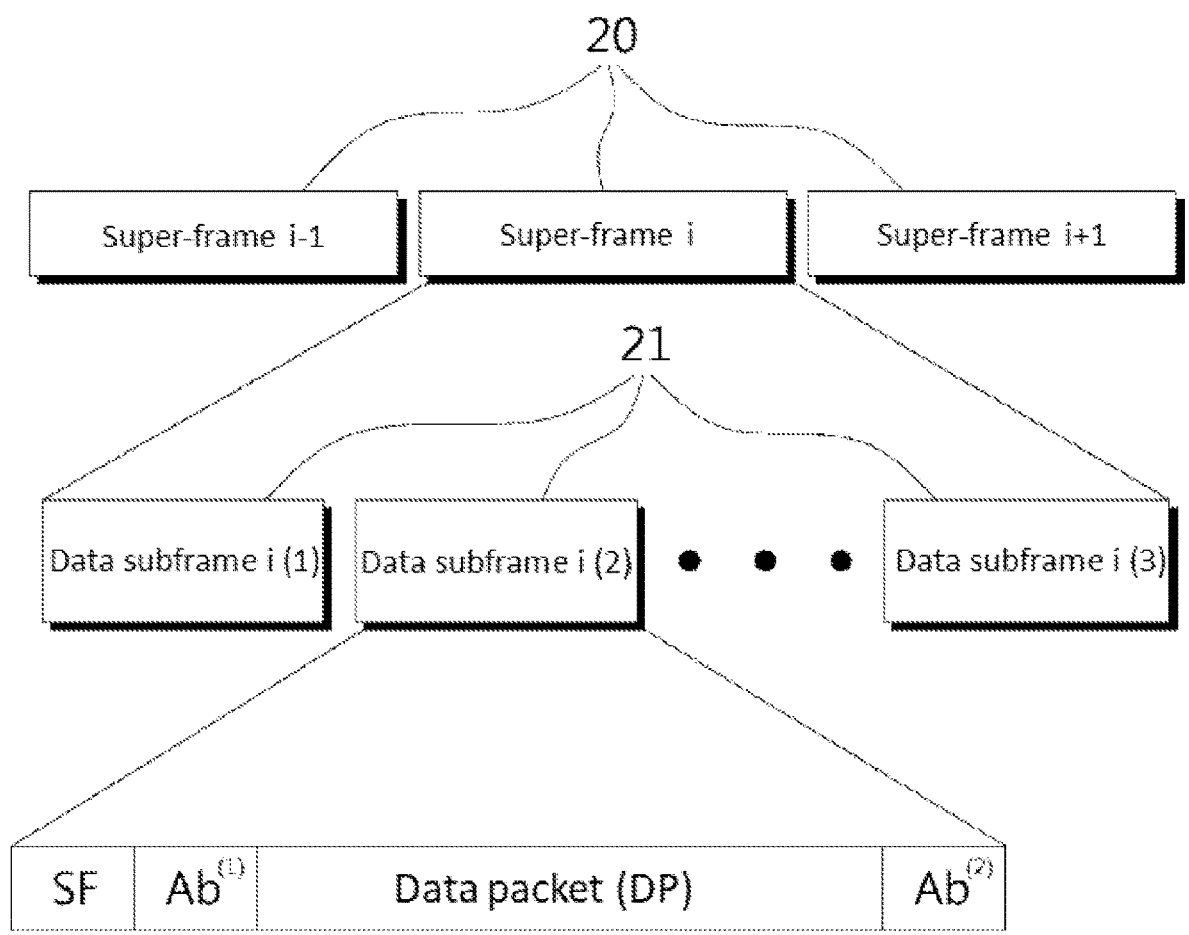
FIG. 7 is a view showing the structure of a data frame of a transmission data in an image sensor communication (ISC) system according to an embodiment of the present invention.

FIG. 7 is a view showing the structure of a data frame of a transmission data in an image sensor communication (ISC) system according to an embodiment of the present invention.

Referring to FIG. 7, in a data frame of a transmission data according to an embodiment of the present invention, a super-frame 20 distinguished by each transmission data to be transmitted is implemented sequentially in plurality. That is, when the transmission data of each super-frame 20 is different from the others, for example, when an LED 130 desires to transmit a different transmission data, each of the transmission data is included in each of the super-frames 20. Accordingly, a transmission data different from the others is included in each of the super-frames 20.

In addition, each of the super-frames 20 includes data subframes (DS) 21 repeated N times each (N is a natural number). Here, a transmission data to be transmitted by the ISC system 100 is included in the data subframe (DS) 21. Since each data subframe 21 including a transmission data to be transmitted is repeatedly transmitted N times as described above, data can be extracted although the rolling shutter camera 130 photographs at an arbitrary time point, and the entire data can be extracted although the entire transmission data is not captured in the photographed frame image at a time due to the varying frame rate of the rolling shutter camera 130.

In addition, each of the data subframes 21 includes a start frame SF, two asynchronous bits (Ab) and a data packet DP. The start frame SF and the asynchronous bits (Ab) are preferably set to be one-bit long considering capacity of the data frame. The asynchronous bits (Ab) performs a function of distinguishing the data packet DP in the data subframe 21, together with a function of distinguishing the super-frame 20. In addition, a transmission data to be transmitted by the ISC system 100 is included in the data packet DP. In this embodiment, it is preferable to alternately insert 1 and 0 of one bit as the asynchronous bits (Ab). For example, the asynchronous bits are set to 1 and inserted in the data subframe 21 if the index of the super-frame 20 distinguished by each transmission data is an odd number, and the asynchronous bits are set to 0 and inserted in the data subframe 21 if the index of the super-frame 20 is an even number. Of course, contrarily, it is possible to alternately insert 0 and 1. Therefore, the asynchronous bits (Ab) perform a function of an identifier for distinguish neighboring super-frames 20.

Like this, in the present invention, a super-frame 20 is configured by including a transmission data to be transmitted in the data subframes (DS) 21 and continuously arranging the data subframe 21 to be repeated N times. Therefore, the super-frame is configured by repeating each transmission data N times, and a transmission data different from the others is included in each super-frame.

Such a structure of data frame is encoding a transmission data to be transmitted as a data frame by the data coding unit 110. That is, the data coding unit 110 encodes a transmission data to be transmitted as a super-frame using the data packet DP, the start frame SF and the asynchronous bits Ab according to the data frame structure proposed in this embodiment, as described above. This is proposed to efficiently extract a transmission data from on/off images of the LED 130 photographed by the rolling shutter camera 140. The process of extracting a transmission data by the data extraction unit using the data frame structure are described in detail in FIG. 3.

Figure 8:
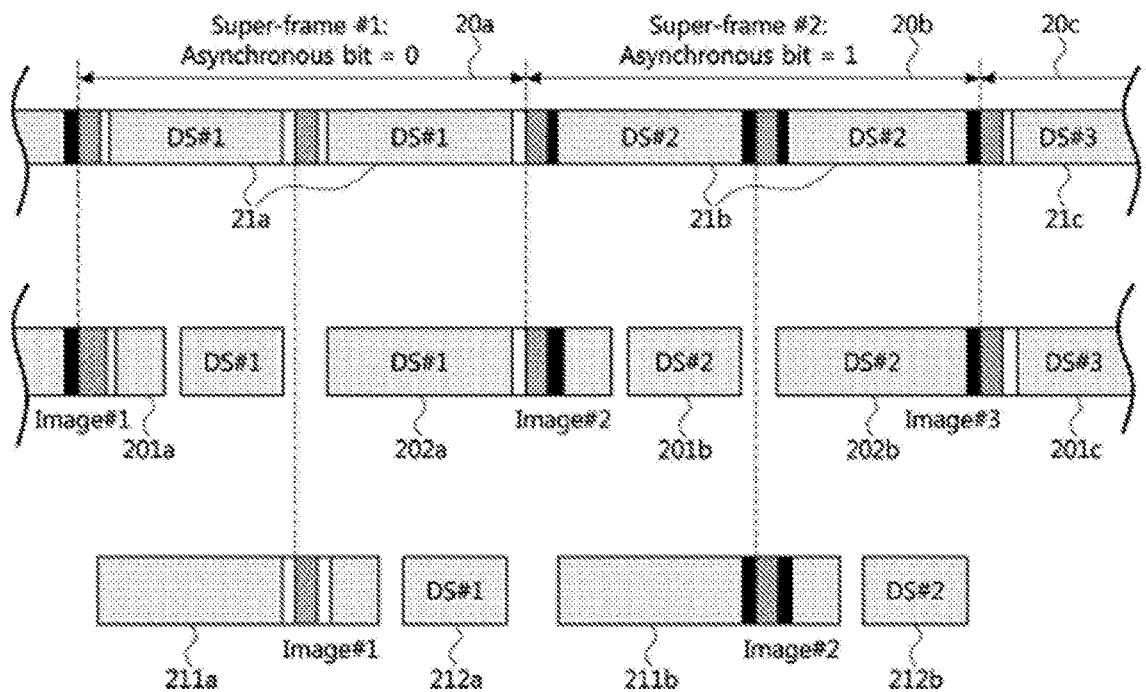
FIG. 8 is a conceptual view showing the process of extracting a transmission data in a rolling shutter camera of an image sensor communication (ISC) system according to an embodiment of the present invention.

FIG. 8 is a conceptual view showing the process of extracting a transmission data in a rolling shutter camera of an image sensor communication (ISC) system according to an embodiment of the present invention.

Figure 9:
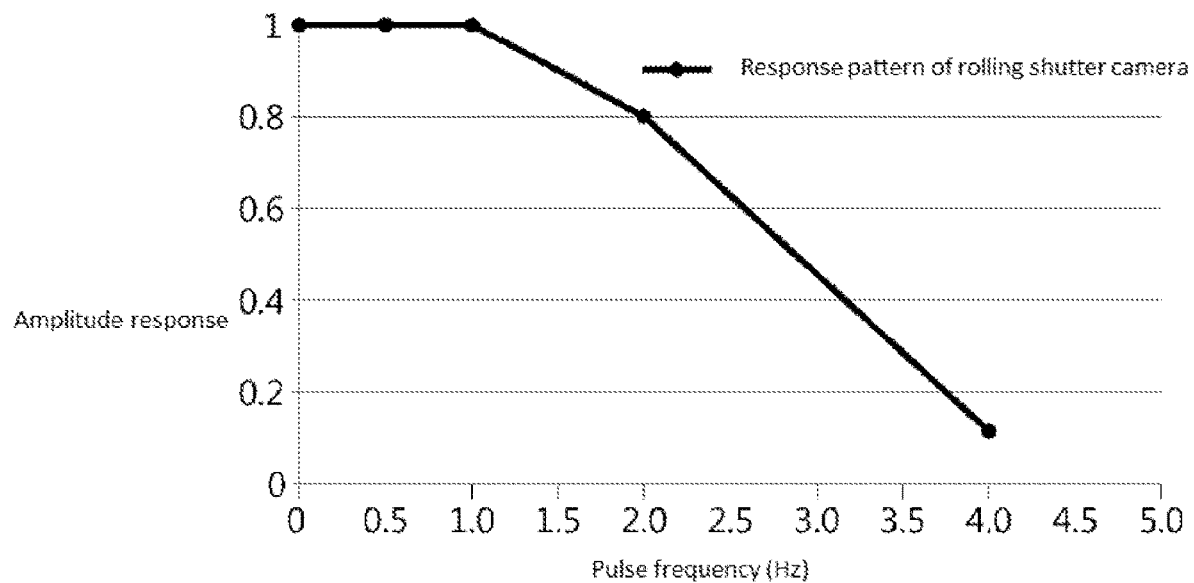
FIG. 9 is a view showing an amplitude response pattern of a rolling shutter camera with respect to a pulse frequency of an LED in an image sensor communication (ISC) system according to an embodiment of the present invention.

In FIG. 8, two super-frames 20a, 20b and 20c are shown as an example for the convenience of explanation, and two data subframes 21a, 21b and 21c are shown in each of the super-frames 20a, 20b and 20c. In addition, an example of repeating the data subframes 21a, 21b and 21c twice (i.e., N=2) in each of the super-frames 20a, 20b and 20c is shown in the figure. Such an example of FIG. 9 is merely an example for describing the present invention, and the present invention is not limited thereto.

FIGS. 8(a) and (b) respectively show an example of photographing a frame image at an arbitrary time point by the rolling shutter camera 130 according to a frame rate while the LED 130 is turned on/off by the LED driving unit 120 in correspondence to the structure of the super-frames 20a, 20b and 20c coded according to the transmission data to be transmitted.

First, FIG. 8(a) shows an example of continuously capturing data subframes (DS) from first to third frame images (image #1 to image #3) by the rolling shutter camera 140 to describe the process of extracting a data subframe by combining two frame images. Specifically, the figure shows an example of capturing a first data subframe 201a of a first super-frame 20a from a first frame image (image #1), capturing a second data subframe 202a of the first super-frame 20a and a first data subframe 201b of a second super-frame 20b from the second frame image (image #2), and capturing a second data subframe 202b of the second super-frame 20b and a first data subframe 201c of a third super-frame 20c from a third frame image (image #3).

At this point, the data extraction unit 160 first confirms the start frame SF and the asynchronous bits Ab from the data subframe of the super-frame to extract the data packet included in each of the super-frames 20a, 20b and 20c. Since one start frame SF and two asynchronous bits Ab are added in the data subframe repeated N times (N=2) in one super-frame, if the start frame SF and the asynchronous bits Ab respectively added at the front and rear ends of the data packet DP are confirmed, the data packet DP can be extracted. Here, since the rolling shutter camera 140 acquires a frame image at an arbitrary time point in this embodiment, there may be a case in which the start frame and the asynchronous bits Ab of the data subframe cannot be confirmed in one frame image.

To solve this problem, in this embodiment, as shown in FIG. 8(a), the data subframe 21a of the first super-frame 20a is extracted by confirming the start frame SF and the front-end asynchronous bit Ab ih the first frame image (image #1) and combining the first data subframe 201a of the first super-frame 20a of the first frame image (image #1) captured and the second data frame 201b of the first super-frame 20a of the second frame image (image #2) captured thereafter. At this point, the data subframe 21a can be confirmed by the asynchronous bit Ab at the rear end of the data packet DP. That is, since the same asynchronous bits Ab are inserted at the front and rear ends of a plurality of data subframes 21a included in the first super-frame 20a, if it is confirmed whether the asynchronous bits Ab are the same, this may mean that the super-frame and the data subframe captured from each frame image include the same transmission data. Accordingly, whether the data packets are the same can be confirmed by confirming the asynchronous bits Ab captured from each frame image.

In addition, this is also applied to the second super-frame 20b in the same manner. That is, the data subframe 21b of the second super-frame 20b is extracted by combining the second data subframe 21b of the second super-frame 20b and the first data subframe 21c of the second super-frame 20b of the third frame image (image #3) captured thereafter, after confirming the start frame and the front-end asynchronous bit Ab from the captured second frame image (image #2). Of course, also herein, the data subframe 21b is confirmed by the asynchronous bit Ab added at the rear end of a corresponding data packet DP.

FIG. 8(a) describes an example of photographing an LED 130 at an arbitrary time point by the rolling shutter camera 140 and capturing on/off images from a frame image, and although the photographing time point is changed, the data subframe can be extracted in the principle as described above. That is, a data subframe can be extracted by combining two frame images according to the photographing time point or the frame rate.

FIG. 8(b) describes a process of extracting a data subframe by one frame image. Specifically, the figure shows an example in which the rolling shutter camera 140 captures the first data subframe 201a and the second data subframe 202a of the first super-frame 20a from the first frame image (image #1) and captures the first data subframe 201b and the second data subframe 202b of the second super-frame 20b from the second frame image (image #2).

At this point, the data extraction unit 160 first confirms the start frame SF and the asynchronous bit Ab from the data subframe of the super-frame captured from the first frame image (image #1). That is, the data extraction unit 160 confirms the start frame SF and the front-end asynchronous bit Ab of the data subframe 201a of the first super-frame 20a captured from the first frame image (image #1) and extracts the data subframe 21a of the first super-frame 20a by combining the data subframe 201a at the front of the start frame SF and the data subframe 202a after the front-end asynchronous bit Ab. At this point, the data subframe 21a can be confirmed by the asynchronous bit Ab at the rear end of the data packet DP.

If there are a front-end asynchronous bit Ab and a rear-end asynchronous bit Ab in one frame image in FIGS. 8(a) and (b), a transmission data is simply extracted from the data packet DP placed between the asynchronous bits Ab. However, in the present invention, in a situation in which a photographing time point of the rolling shutter camera 140 is arbitrarily determined and the frame rate of the rolling shutter camera 140 varies, the probability of the data packet DP, the front-end asynchronous bit Ab and the rear-end asynchronous bit Ab not all being in one frame image is high. To solve this problem, a method of extracting a transmission data by combining two data packets from two frame images as shown in FIG. 8(a) and a method of extracting a transmission data by combining two data packets from one frame image as shown in FIG. 8(b) are presented.

Like this, in the present invention, the rolling shutter camera 140 may extract a data packet in a data frame by combining data subframes of the data frame captured from each frame image, and accordingly, a transmission data can be extracted. The data extraction may include extraction of data by two frame images as shown in FIG. 8(a) and extraction of data by one frame image as shown in FIG. 8(b). For the data extraction of these methods, one or more data subframes should be captured from each frame image in the present invention. To this end, the number of captured data subframes per frame image should satisfy the mathematical expression shown below.

Mathematical expression 1

$$1 \leq N_{repeats} = \frac{t_{cap}}{DS_{length}} < N \quad \text{[Equation 1]}$$

tcap is a capture time when one frame image is exposed in the rolling shutter camera, N is the number of data subframes DS repeated in a super-frame, and DSlength is the length of a data subframe. Here, when Nrepeats is 1, the data rate demonstrates the maximum performance in unidirectional communication.

FIG. 9 is a view showing an amplitude response pattern of a rolling shutter camera with respect to a pulse frequency of an LED in an image sensor communication (ISC) system according to an embodiment of the present invention.

Referring to FIG. 9, in the ISC system according to the present invention, the LED driving unit 120 drives the LED 130 according to a set pulse frequency. At this point, on/off driving of the LED 130 should avoid flickering for the safety of human eyes. To this end, the pulse frequency for the on/off of the LED 130 should be sufficiently high. For example, the pulse frequency of the LED 130 should be at least 100 Hz or higher. However, the frame rate of the rolling shutter camera 140 applied to the ISC system is approximately 30 fps, which is considerably lower than the pulse frequency of the LED 130 of KHz unit. Since the frame rate of the rolling shutter camera 140, which is a receiver, is very low compared with on/off flickering speed of the LED 130 as described above, data loss may be invited when on/off images of the LED 130 are captured from a frame image due to the difference of speed. Therefore, in the present invention, when the rolling shutter camera 140 is applied, the sampling rate of a captured frame image should be set to the shutter speed, not to the frame rate. That is, the shutter speed of the rolling shutter camera 140 is KHz unit, and this is a speed as high as to be easily recorded even when the state of the LED 130 changes according to data transmission.

Figure 10:
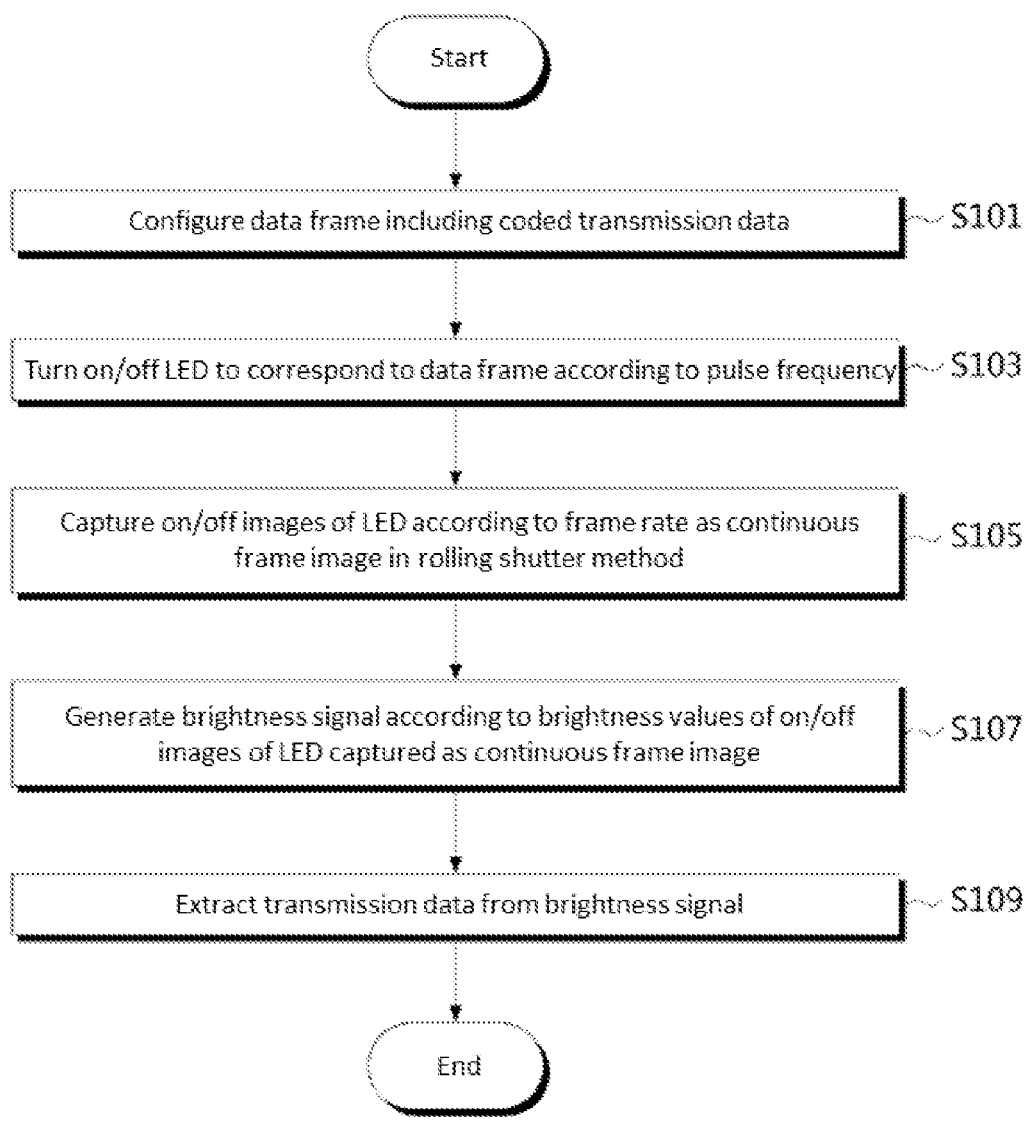
FIG. 10 is a flowchart illustrating an image sensor communication method using an LED and a rolling shutter camera according to an embodiment of the present invention.

FIG. 9 is a graph showing a result of an experiment performed to observe the response of the rolling shutter camera 140 to the LED 130 which flickers to extract a range of pulse frequency appropriate to the rolling shutter camera 140 as a receiver, showing an amplitude response pattern according to a pulse frequency while the distance d from the LED 130 to the rolling shutter camera 140 is maintained constantly. In FIG. 10, it is understood that the response of the rolling shutter camera 140 is small at a high pulse frequency and the rolling shutter camera 140 cannot record a signal at a pulse frequency higher than the shutter speed. Accordingly, it is preferable to set the on/off pulse frequency of the LED 130 according to the present invention in a range within the shutter speed of the rolling shutter camera 140. Since a general rolling shutter camera 140 has a shutter speed of 4 KHz, in this embodiment, it is preferable to set the on/off pulse frequency in a range of 100 Hz to 4 KHz. Of course, this is merely an example, and it is natural that the pulse frequency of the LED 130 can be further extended in the case of a rolling shutter camera 140 having a shutter speed higher than the range.

FIG. 10 is a flowchart illustrating an image sensor communication method using an LED and a rolling shutter camera according to an embodiment of the present invention.

Referring to FIG. 10, in an image sensor communication method using an LED and a rolling shutter camera according to the present invention, the data coding unit 10 encodes a transmission data to be transmitted and configures a data frame including the coded transmission data (step S101). In this embodiment, a plurality of super-frames 20 distinguished by each of a plurality of transmission data to be transmitted is continuously arranged in the data frame, and each of these super-frames 20 includes continuously repeated N data subframes DS 21 (N is a natural number). In addition, each of the data subframes 21 is configured of a data packet DP including a transmission data coded as described above, asynchronous bits Ab respectively added at the front and rear ends of the data packet DP and a start frame SF added at the front end of the front-end asynchronous bit Ab.

Subsequently, the LED driving unit 120 turns on/off the LED 130 to correspond to the data frame according to a set pulse frequency. Therefore, the LED 130 is turned on/off to correspond to the data frame including the transmission data. Specifically, the LED 130 is turned on/off to correspond to the start frame SF, the front-end asynchronous bit Ab, the data packet DP and the rear-end asynchronous bit Ab. Of course, the LED 130 is turned on/off to repeat such a data frame N times as set in advance and, furthermore, turned on/off to distinguish the super-frames.

Subsequently, the rolling shutter camera 140 captures on/off images of the LED 130 as a continuous frame image at each of a plurality rows in a rolling shutter method according to a set frame rate (step S105). The rolling shutter camera 140 photographs and captures images at each of a plurality of rows during one capture time 10. At this point, photographing images at each row is accomplished in a nonlinear scan method at preset regular time intervals. This is sequentially exposing each row of image sensors (not shown) provided inside the camera for a preset integration time, i.e., exposing each row at predetermined time intervals. The time between the last integration time of the first row and the last integration time of the last row is referred to as a frame time 12, and addition of the integration time and the frame time becomes the capture time 10.

Then, the image processing unit 150 generates a brightness signal according to brightness values of the on/off images of the LED 130 captured as a continuous frame image at each row (step S107), and the data extraction unit 160 extracts a transmission data from the brightness signal (step S109).

Figure 11:
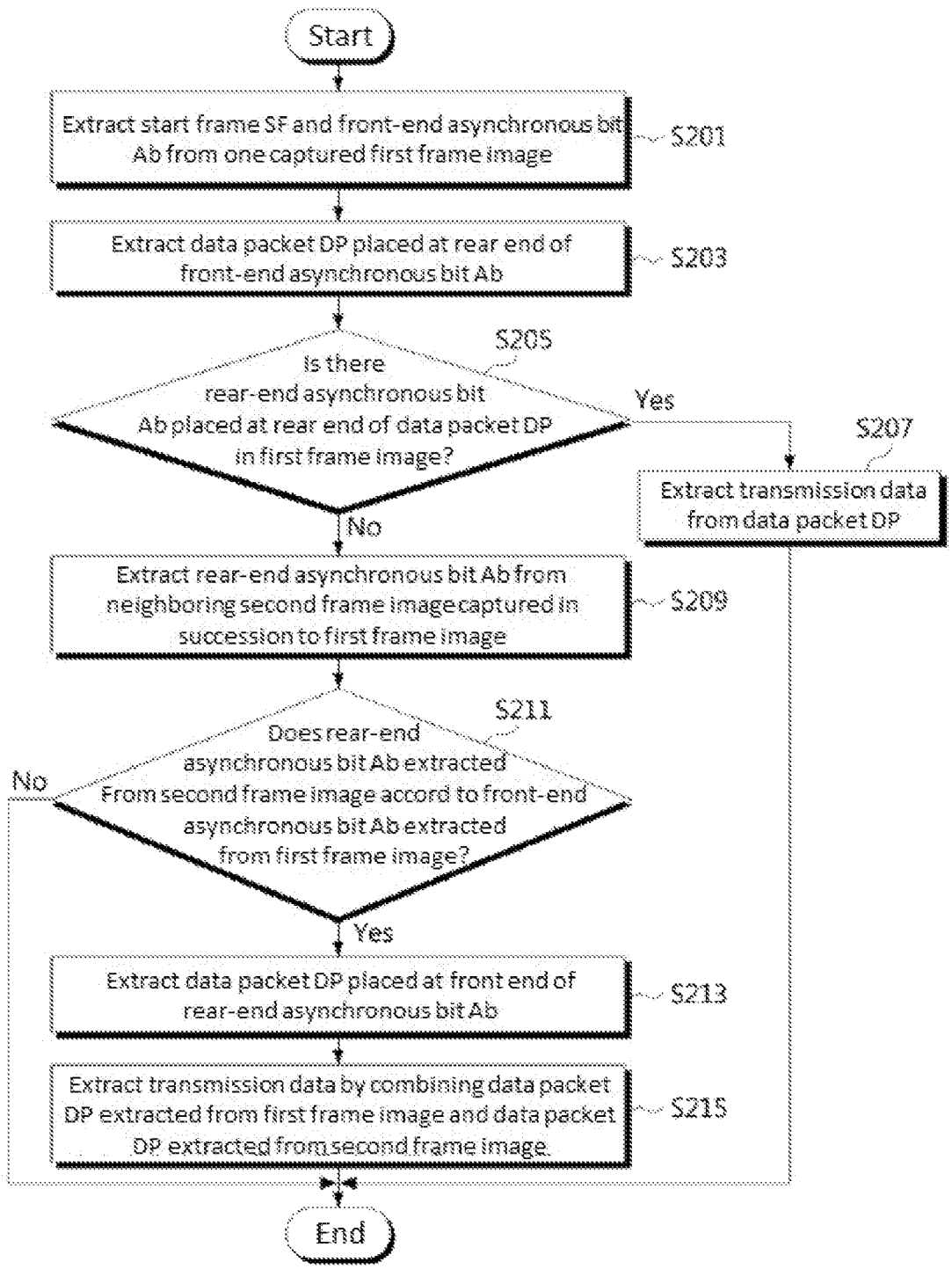
FIG. 11 is a flowchart illustrating the process of extracting a transmission data by a data extraction unit when image sensor communication is performed using an LED and a rolling shutter camera according to an embodiment of the present invention.

FIG. 11 is a flowchart illustrating the process of extracting a transmission data by a data extraction unit when image sensor communication is performed using an LED and a rolling shutter camera according to an embodiment of the present invention.

Referring to FIG. 11, for extraction of a transmission data according to an embodiment of the present invention, first, the data extraction unit 160 extracts a start frame SF and a front-end asynchronous bit Ab from one captured first frame image (step S201). Subsequently, the data extraction unit 160 extracts a data packet DP placed at the rear end of the front-end asynchronous bit Ab (step S203). Subsequently, it is determined whether a rear-end asynchronous bit Ab placed at the rear end of the data packet exists in the first frame image (step S205), and the data extraction unit 160 extracts a transmission data from the data packet DP if there exists a rear-end asynchronous bit Ab (step S207) and extracts a rear-end asynchronous bit Ab from a neighboring second frame image captured in succession to the first data image if there is no rear-end asynchronous bit Ab (step S209). Like this, it is determined whether the rear-end asynchronous bit Ab extracted from the second frame image accords to the front-end asynchronous bit Ab extracted from the first frame image (step S211). If they accord to each other, the data extraction unit 160 extracts the data packet DP placed at the front end of the rear-end asynchronous bit Ab (step S213). This is since that if the transmission data are the same, the asynchronous bits Ab inserted in the data subframes DS continued in a super-frame are the same, and thus if the front-end asynchronous bit Ab and the rear-end asynchronous bit Ab of a data packet DP are the same, it means that the data packets DP, i.e., the transmission data, included in the data subframes are the same. Subsequently, the transmission data is extracted by combining the data packet DP extracted from the first frame image and the data packet DP extracted from the second frame image (step S215). Therefore, the transmission data is extracted from two neighboring frame images.

Figure 12:
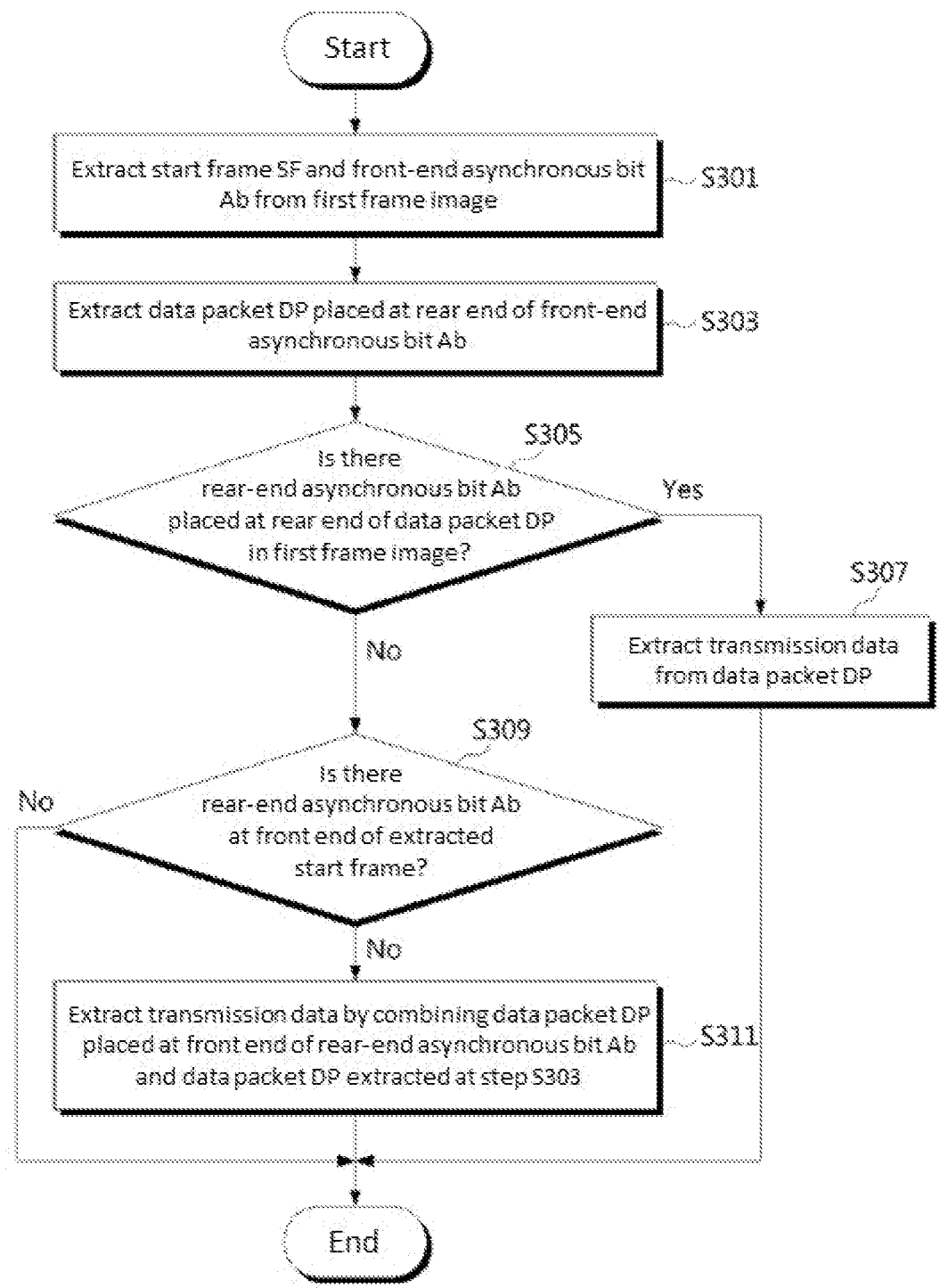
FIG. 12 is a flowchart illustrating the process of extracting a transmission data when image sensor communication is performed using an LED and a rolling shutter camera according to another embodiment of the present invention.

FIG. 12 is a flowchart illustrating the process of extracting a transmission data when image sensor communication is performed using an LED and a rolling shutter camera according to another embodiment of the present invention.

Referring to FIG. 12, in another embodiment of the present invention, the data extraction unit 160 extracts a start frame SF and a front-end asynchronous bit Ab from one captured first frame image (step S301) and subsequently extracts a data packet DP placed at the rear of the front-end asynchronous bit Ab (step S303). Subsequently, the data extraction unit 160 determines whether a rear-end asynchronous bit Ab exists at the rear of the data packet DP (step S305), extracts a transmission data from the data packet DP if there exists a rear-end asynchronous bit Ab (step S307), and determines whether a rear-end asynchronous bit Ab exists at the front of the extracted start frame SF (step S309). If there exists a rear-end asynchronous bit Ab, a transmission data is extracted by combining the data packet DP at the front end of the rear-end asynchronous bit Ab and the data packet DP extracted at step S303 (step S311). This is confirming a start frame and a front-end asynchronous bit Ab in a frame image and extracting a transmission data from a data packet DP at the front end of the start frame SF and a data packet DP at the rear end of the front-end asynchronous bit Ab, i.e., extracting a transmission data from one frame image.

Figure 13:
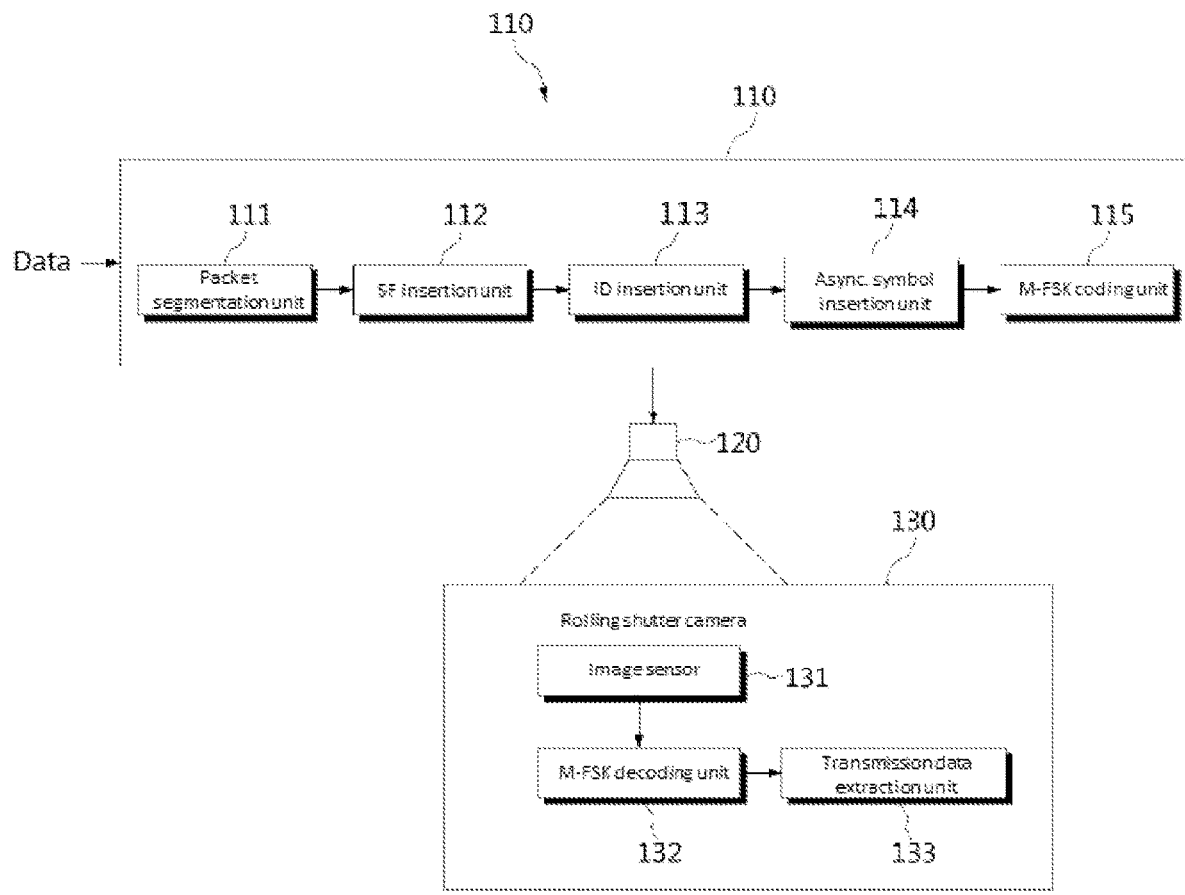
FIG. 13 is a view showing the configuration of an image sensor communication system between an LED and a rolling shutter camera using multiple frequency shift keying (M-FSK) according to still another embodiment of the present invention.

FIG. 13 is a view showing the configuration of an image sensor communication system between an LED and a rolling shutter camera using multiple frequency shift keying (M-FSK) according to still another embodiment of the present invention.

Referring to FIG. 13, an image sensor communication system 100 between an LED and a rolling shutter camera using multiple frequency shift keying (M-FSK) according to the present invention (hereinafter, referred to as an image sensor communication system) largely includes a data coding unit 110, at least one LED 120 and a rolling shutter camera 130.

The data coding unit 110 includes a packet segmentation unit 111 for segmenting an input transmission data into a plurality of equal packets, an SF insertion unit 112 for inserting a start frame SF in each of the segmented packets, an ID insertion unit 113 for inserting identification information ID for distinguishing an LED in each data packet in which the start frame SF is inserted, a clock signal generation unit 114 for generating a clock signal, an asynchronous symbol insertion unit 115 for inserting an asynchronous symbol, according to the generated clock signal, in each data packet in which the start frame SF and the identification information ID are inserted, and an M-FSK coding unit 116 for allocating a frequency corresponding to the data packet using a preset multiple frequency shift keying (M-FSK) coding table.

Such a data coding unit 110 performs a function of encoding a data to correspond to a transmission data to be transmitted through on/off of the LED 120. To this end, the packet segmentation unit 111 segments transmission data input from the outside into a plurality of equal packets. This is to divide data continuously input in series into packets of equal size to transmit the data in packets. The SF insertion unit 112 inserts a start frame of a preset bit in each packet of the data segmented like this. The start frame 112 may be used an index for identifying the start of a data packet. It is preferable to insert a start frame of one bit to reduce the size of the data packet. The ID insertion unit 113 inserts identification information ID of a corresponding LED to identify to which LED, among at least one or more LEDs, a data packet corresponds. It is preferable to insert identification information ID of one bit considering the capacity of the data packet. When one LED is applied, the identification information ID may or may not be inserted. In the present invention, the clock signal generation unit 114 generates a clock signal. This is used to separately insert an asynchronous symbol since the frame rate of an image sensor 131 of the rolling shutter camera 130 according to the present invention changes. That is, the asynchronous symbol is inserted in correspondence to the clock signal, and an asynchronous symbol of a different value is inserted for each of clock signals neighboring to each other. The asynchronous symbol insertion unit 115 inserts an asynchronous symbol in each data packet, in which the start frame SF and the identification information ID are inserted as described above, according to the clock signal generated by the clock signal generation unit 114. Such an asynchronous symbol can be an important index for determining an image frame when the frame rate of the image sensor changes. This will be described below in detail. A plurality of frequencies is set in the preset multiple frequency shift keying (M-FSK) coding table according to bit values of the asynchronous symbol and the data packet. This is based on the assumption that the LED according to the present invention turns on/off at a plurality of multiple frequencies. That is, a corresponding data is transmitted by turning on/off the LED at a plurality of frequencies. At this point, bit values of the asynchronous symbols and the data packet are set in advance in the M-FSK coding table for each frequency. Accordingly, in the present invention, the M-FSK coding unit 116 allocates a frequency corresponding to a data packet to be transmitted using the M-FSK coding table.

At least one or more LEDs 120 are provided. The LED 120 performs a function of a transmitter in the image sensor communication system 100 according to the present invention. In this embodiment, the LED 120 is turned on or off at a pulse rate of a frequency allocated as described above in correspondence to a transmission data coded by the data coding unit 110. Data is transmitted according to on/off. According to this embodiment, when the LED 120 is provided in plurality, they may be arranged in an array of 1×N, M×1 or preferably M×N. Of course, they may be arranged in a variety of forms, such as a circular shape, a radial shape, an oval shape and the like. If the pulse rate for turning on/off the LED 120 is 110 or higher per second, on/off of the LED 120 is not distinguished by human eyes, and the LED is recognized as being continuously turned on. Of course, such a pulse rate is can be adjusted. Although the LED 120 is representatively described as a transmitter for transmitting data by radiating light in the present invention, the present invention is not limited thereto. Any light source capable of transmitting data through on/off is included in the scope of the present invention, and it is noted that the LED is expressed to represent all light sources in the present invention.

The rolling shutter camera 130 includes an image sensor 131 for capturing on/off images of the LED 120 in a rolling shutter method, an M-FSK decoding unit 132 for extracting a data packet corresponding to an allocated frequency using a preset M-FSK coding table from the on/off images captured by the image sensor 131, and a transmission data extraction unit 133 for extracting a transmission data from the extracted data packet. For example, the rolling shutter camera 130 may include a digital camera and a camera mounted on a cellular phone, a smart device or the like.

Such a rolling shutter camera 130 basically photographs and captures images at each of a plurality of rows during one capture time. At this point, photographing images at each row is accomplished in a nonlinear scan method at preset regular time intervals. This is sequentially exposing each row of image sensors 131 of a rolling shutter method provided inside the camera for a preset integration time, i.e., exposing each row at predetermined time intervals. At this point, the time between the last integration time of the first row and the last integration time of the last row is referred to as a frame time 12, and addition of the integration time and the frame time becomes the capture time 10. In the present invention, the rolling shutter camera 130 photographs the LED 120 while the LED 120 is turned on/off. That is, the rolling shutter camera captures on/off images at each of a plurality of rows while the LED 120 is turned on and off. For example, an image captured during the capture time appears in white color W when the LED 120 is in an on state and appears in black color B when the LED 120 is in an off state. Of course, brightness values of the white color W and the black color B are different in the process of turning on and off the LED 120. Such a rolling shutter camera 130 performs a function of a receiver in the image sensor communication system 100. The rolling shutter camera 130 is provided with the image sensors 131 for capturing images in a rolling shutter method inside thereof to capture on/off images of the LED 120 and photographs the LED 120 by sequentially exposing each row of image sensors. A CMOS semiconductor sensor, for example, may be used as the image sensor 131. The M-FSK decoding unit 132 extracts a data packet corresponding to an allocated frequency using the preset M-FSK coding table from the on/off images of the LED 120 captured by the image sensor 131 as described above. Specifically, after confirming and excluding a start frame SF and identification information ID from a transmitted data frame and extracting an asynchronous symbol and a data packet corresponding to the clock signal, the data packet excluding the asynchronous symbol is extracted. Extraction of data packet like this is confirming a frequency allocated to each LED 120 and extracting an asynchronous symbol and a data packet corresponding to the frequency from the preset M-FSK coding table. This will be described below in detail. In addition, the transmission data extraction unit 133 extracts a transmission data from the data packet extracted as described above. To this end, the transmission data extraction unit 133 extracts a transmission data from brightness values appearing differently in a white band and a black band appearing when the image sensor 131 of a rolling shutter method captures images of on and off of the LED 120. That is, a color appearing according to on/off of the LED 120 may be expressed as a brightness value of, for example, 0 to 255. For example, the white band may express a brightness value of 255, and the black band may express a brightness value of 0. Of course, the range of the brightness values may be changed. In addition, since the frame rate of the image sensor 131 changes as described above, the LED 120 may change from an off state to an on state or from an on state to an off state when the LED 120 is photographed at an arbitrary time point, and thus the brightness value may be a band of an intermediate color between the white band and the black band when the image is captured. This may be expressed as a brightness value between 0 and 255. Since the LED 120 is continuously turned on or off according to an allocated frequency, a brightness signal of on/off images has a continuous value at each row. Therefore, the transmission data extraction unit 133 extracts a transmission data from a brightness signal of on/off images of the LED 120.

Meanwhile, although it is not shown in the figure, each LED 120 may further include a dimming control unit (not shown) for performing dimming control by adjusting a duty ratio of on and off. This means that the dimming control can be performed at the time length of off with respect to on when on/off is repeated according to the generated clock signal. For example, when the LED 120 is turned on/off at an arbitrary frequency and the ratio of on:off is set to 1:9, the duty ratio is 10%. As another example, if the ratio of on:off is set to 5:5, the duty ratio is 50% Like this, in the present invention, the dimming control may be performed together by selectively adjusting the duty ratio.

Figure 14:
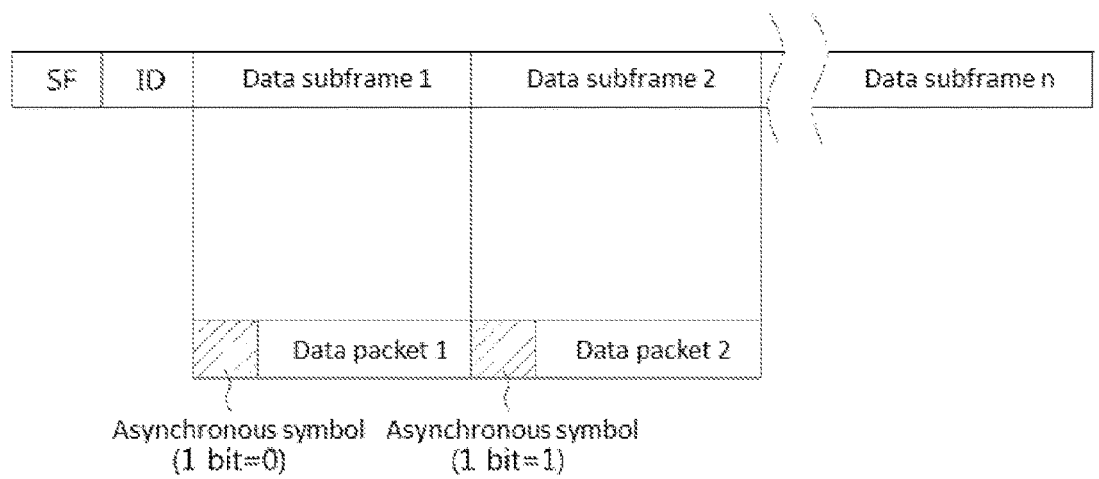
FIG. 14 is a view showing the structure of a data frame according to an embodiment of the present invention.

FIG. 14 is a view showing the structure of a data frame according to an embodiment of the present invention.

Referring to FIG. 14, the structure of a data frame according to the present invention includes a start frame SF and identification information ID of an LED 120. The start frame SF and the identification information ID are preferably set to be one-bit long considering capacity of the data frame. Subsequently, a plurality of data subframes follows. Each of the data subframes includes an asynchronous symbol and a data packet. Such an asynchronous symbol is inserted according to the clock signal. For example, in the present invention, it is preferable to alternately insert 1 and 0 of one bit according to the clock signal.

Figure 15:
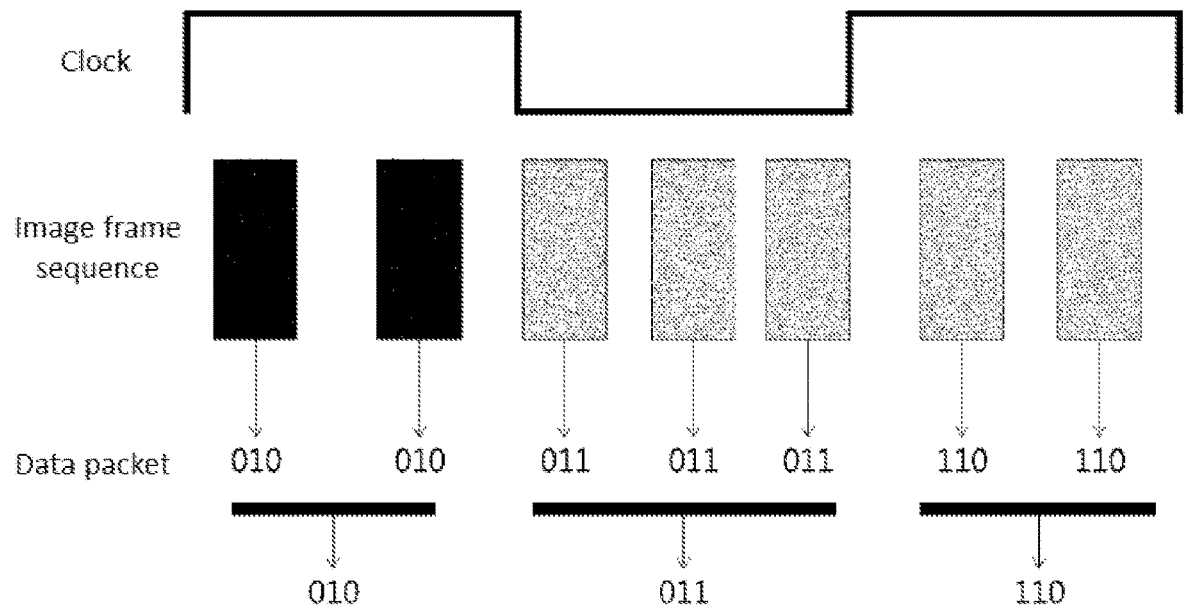
FIG. 15 is an exemplary view showing image frames captured by a rolling shutter camera according to an embodiment of the present invention.

FIG. 15 is an exemplary view showing image frames captured by a rolling shutter camera according to an embodiment of the present invention.

As shown in the example of FIG. 15, a plurality of image frames is captured in correspondence to the clock signal. However, as shown in the figure, since the frame rate of the image sensor 131 according to the present invention changes, it is understood that two image frames are captured at the first clock and three image frames are captured at the second clock. In other words, although the same number of image frames are captured at each clock if the frame rate of the image sensor 131 is constant, if the frame rate of the image sensor 131 varies as shown in the present invention, the number of image frames captured at each clock may vary. Accordingly, in the present invention, it is important to correctly map a captured image frame to each clock. It is since that a different data that can be extracted according to which image frame is captured at which clock. Therefore, in the present invention, this problem is solved by alternately inserting 1 and 0 of one bit in the data packet at each clock as shown in FIG. 17.

Figure 16:
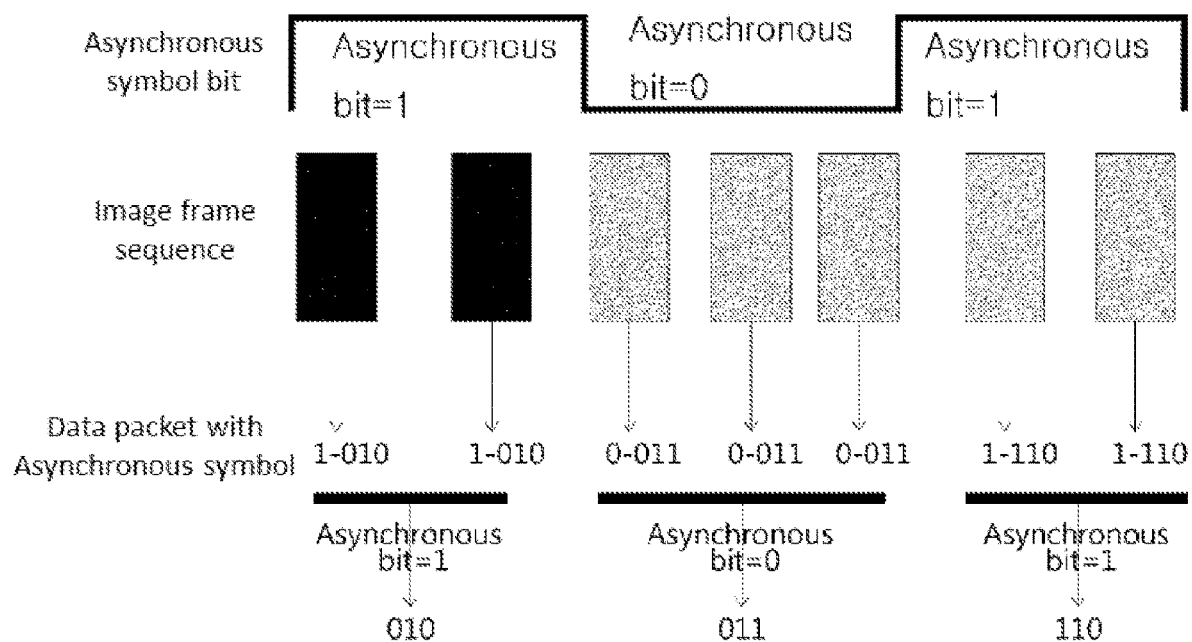
FIG. 16 is an exemplary view showing data packets in which an asynchronous symbol is inserted according to an embodiment of the present invention.

FIG. 16 is an exemplary view showing data packets in which an asynchronous symbol is inserted according to an embodiment of the present invention.

Referring to an embodiment of FIG. 16, in the present invention, asynchronous symbols 1 and 0 of one bit are alternately allocated at each clock. For example, in the example of FIG. 16, an asynchronous symbol 1 is allocated to an image frame to be captured at the first clock, and an asynchronous symbol 0 is allocated to an image frame to be captured at the second clock. Accordingly, the data packet becomes 1010 at the first clock since 1 is allocated at the front end of transmission data 010, and the data packet becomes 0011 at the second clock since 0 is allocated at the front end of transmission data 011. Like this, since the frame rate of the image sensor 131 varies, 1 and 0 are alternately allocated at each clock signal to solve the synchronization problem when a different number of image frames are captured at each clock signal.

Figure 17:
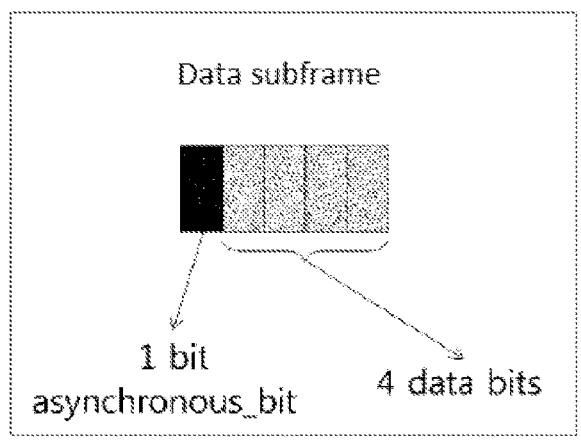
FIG. 17 is an exemplary view showing frequencies allocated according to bit values of an asynchronous symbol and a data packet of a data subframe according to an embodiment of the present invention.

FIG. 17 is an exemplary view showing frequencies allocated according to bit values of an asynchronous symbol and a data packet of a data subframe according to an embodiment of the present invention.

Referring to FIG. 17, the M-FSK coding unit 115 according to the present invention allocates a frequency according to bit values of an asynchronous symbol and a data packet configuring a data subframe using a preset multiple frequency shift keying (M-FSK) coding table. When a data subframe is configured of an asynchronous symbol of one bit and a data packet of four bits as shown in the example of FIG. 5, a different frequency is allocated according to the bit values of the asynchronous symbol and the data packet. For example, a frequency of f0 is allocated if the data subframe is a start frame, and f1 is allocated if bit values of the asynchronous symbol and the data packet of the data subframe are 00000 (i.e., 0 of asynchronous symbol and 0000 of data packet), f2 is allocated if bit values are 00001, and f3 is allocated if bit values are 00010. Since frequencies are allocated as shown in FIG. 4, f32 is allocated if bit values are 1111. At this point, the M-FSK coding unit 115 uses the M-FSK coding table when it allocates a frequency according to a data subframe. Such an M-FSK coding table is set and stored in advance in the data coding unit 110 of the transmitting side and the rolling shutter camera 130 of the receiving side. Here, it is important to determine the number of frequencies when a frequency is allocated according to a data subframe. This will be described below.

Figure 18:
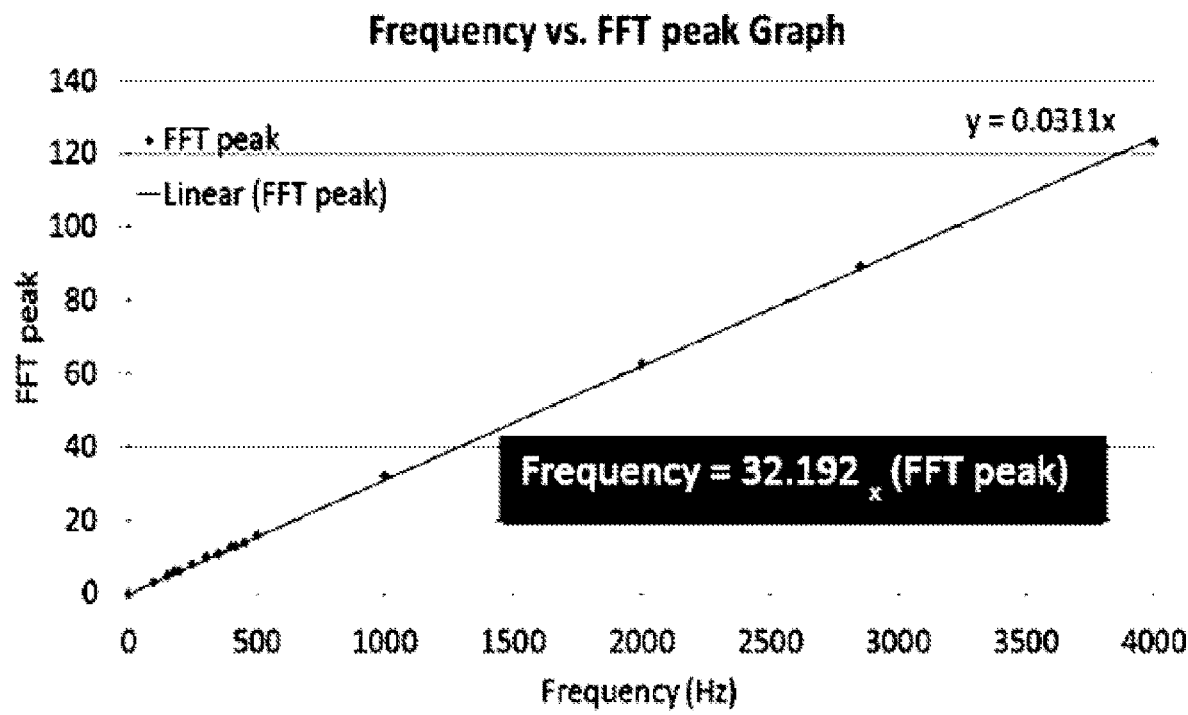
FIG. 18 is an exemplary graph showing FFT peaks by performing FFT on the frequencies according to an embodiment of the present invention.

FIG. 18 is an exemplary graph showing FFT peaks by performing FFT on the frequencies according to an embodiment of the present invention.

Referring to FIG. 18, frequency allocation according to the present invention relies on a scanning rate, which is a unique feature of the rolling shutter camera 130. That is, a peak value of each band among the frequency bands captured by the rolling shutter camera 130 should be determined according to the response of a specific camera. For example, in this embodiment, it is assumed that the resolution of a USB camera used for an experiment is 640×480, a constant capture time is 31.326 msec, a pixel sampling interval is 1/480×tcap=0.06526 msec, and a sampling rate is 1000/0.06526 msec=15.323 KHz. In addition, some parameters (e.g., exposure time) are determined as described below using the camera described above.

Mathematical expression 2

$$t_{cap} = \frac{480}{\text{pulse width}} \times \text{pulse interval} = \frac{480}{7.66129} \times 0.5 \text{ (msec)} \quad [\text{Equation 2}]$$

$$\Delta t_{cap} = t_{cap} \times \frac{\Delta (\text{pulse width})}{\text{pulse width}} = 16.10^{-5} \text{ (msec)}$$

A correlation with FFT peak values (constants) appears as shown in FIG. 6 through fast Fourier transform (FFT) performed on the frequency band of the specific camera. At this point, the FFT peak value should be at least 1. That is, the interval of FFT peaks should be $(\Delta FFT_{peak}) \geq 1$, and at this point, the minimum value of the frequency interval is $(\Delta f_{min}) \geq 32.192$ Hz. Accordingly, in the case of the specific camera described above, a linear proportional relationship is formed between the frequency and the FFT peak value, and an allocated frequency becomes 32.192×FFT peak value. That is, the relation between frequency allocation f and an FFT peak value L is f=32.192×L. If this is generalized and applied to another camera, a different pixel sampling rate can be calculated as shown below.

Mathematical expression 3

$$f = 32.192 \times \frac{\text{pulse sampling rate}}{15.323 \text{ kHz}} \times L \quad [\text{Equation 3}]$$

Here, the pixel sampling rate is calculated by the width of the resolution of an image divided by the capture time of an image of the rolling shutter camera. For example, the width of an image at a resolution of 640×480 is 480 pixels. Accordingly, if frequency allocation is determined, an interval $\Delta FFT_{peak}$ of FFT peaks of at least 1 can be determined. At this point, a minimum value $\Delta f_{min}$ of the frequency interval minimally required to avoid mutual interference is 32.192 Hz in the example of FIG. 6, and if $\Delta FFT_{peak}$ is determined, the M-FSK coding unit 115 determines the maximum number (Nf, an integer) of allocated frequencies, and specifically, the maximum number is determined as an integer satisfying Nf≤≤(capturing frequency of image sensor of rolling shutter camera)/($\Delta FFT_{peak} \times \Delta f_{min}$). An example thereof is described in FIGS. 7 to 10.

Figure 19:
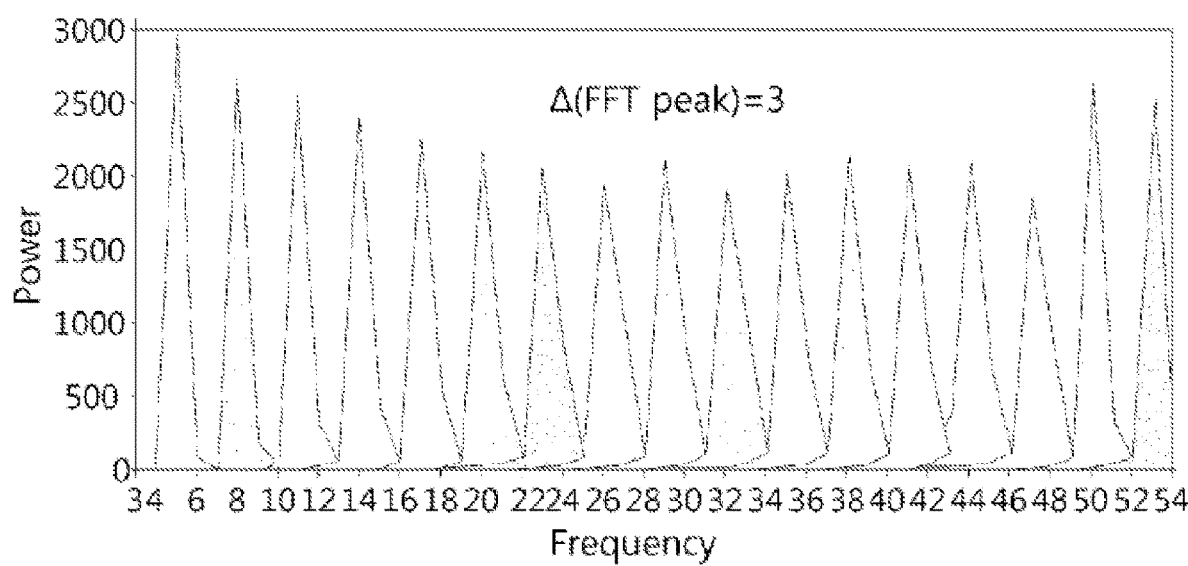
FIG. 19 is a graph showing intervals of FFT peaks according to an embodiment of the present invention.

FIG. 19 is a graph showing intervals of FFT peaks according to an embodiment of the present invention.

Referring to FIG. 19, it is assumed that the capturing frequency of a specific rolling shutter camera 130 according to the present invention is 2.3 KHz, and the minimum value $\Delta f_{min}$ of the frequency interval is 32.192 Hz as shown in FIG. 18, and at this point, in the case of an example in which $\Delta FFT_{peak}$ is 3, the maximum number Nf of frequency allocated channels is calculated as shown in the mathematical expression described below.

Mathematical expression 4

$$N_f \leq \frac{2.3 \text{ kHz}}{32.192 \text{ Hz} \times 3} = 23 \qquad [\text{Equation 4}]$$

Accordingly, in the case of the example described above, the number of allocated frequencies is 23 in maximum.

Figure 20:
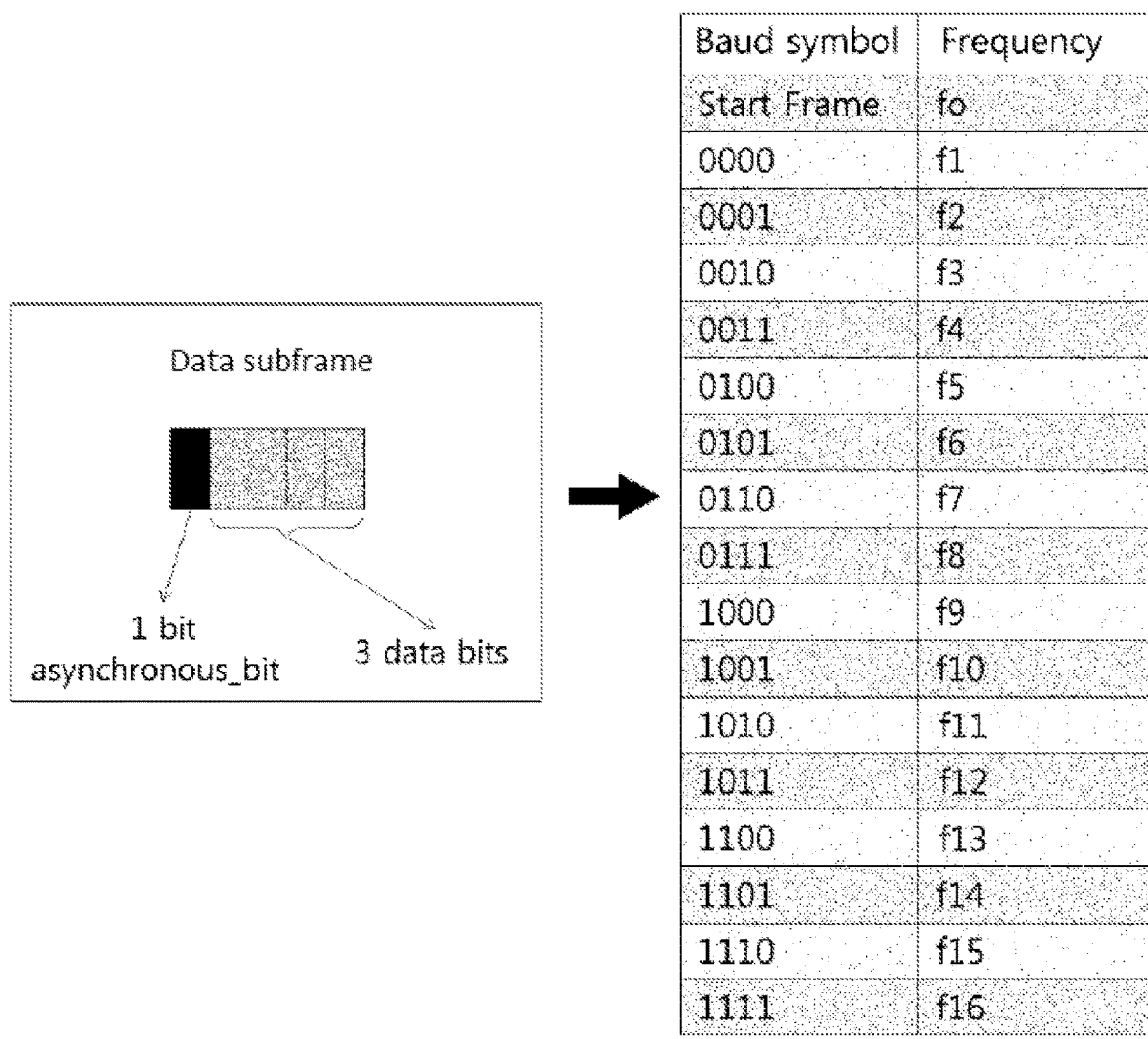
FIG. 20 is an exemplary view showing frequencies allocated according to bit values of an asynchronous symbol and a data packet of a data subframe according to FIG. 19.

FIG. 20 is an exemplary view showing frequencies allocated according to bit values of an asynchronous symbol and a data packet of a data subframe according to FIG. 19.

FIG. 20 shows an example of allocating a frequency using a coding table by selecting, for example, sixteen frequency channels among twenty-three frequency channels. That is, in the example of FIG. 20, a frequency between f1 and f16 is allocated according to bit values of an asynchronous symbol and a data packet configuring a data subframe. Here, the M-FSK coding table shown in FIG. 7 is determined and stored in advance.

Figure 21:
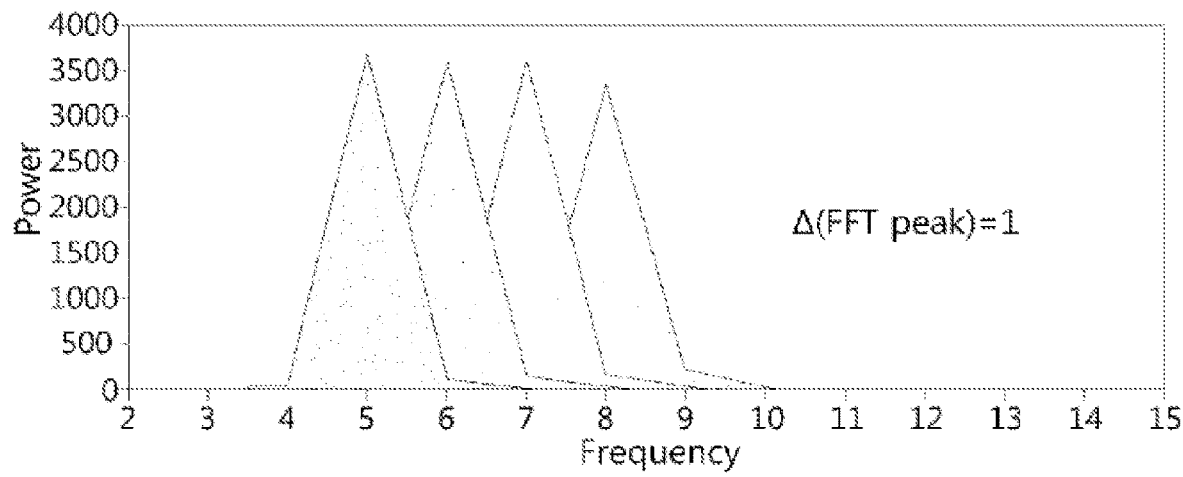
FIG. 21 is a graph showing intervals of FFT peaks according to another embodiment of the present invention.
Figure 22:
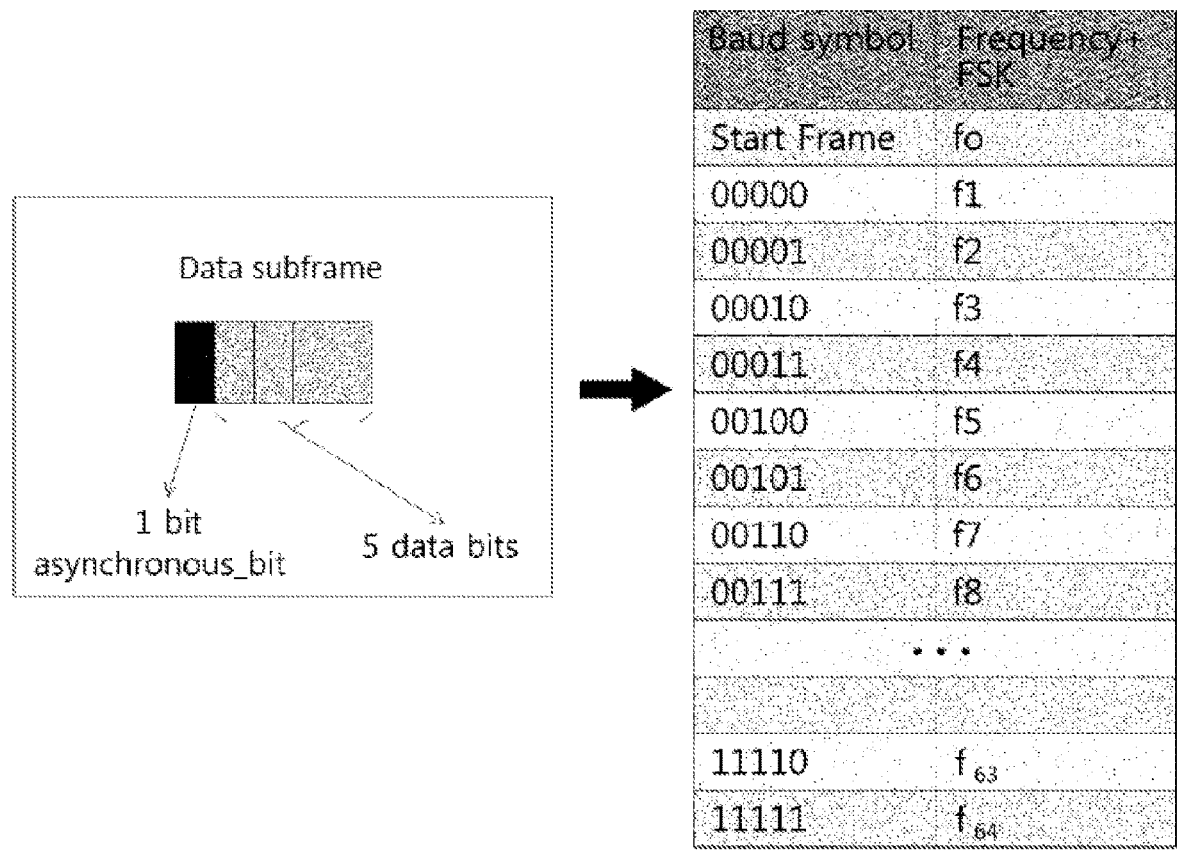
FIG. 22 is an exemplary view showing frequencies allocated according to bit values of an asynchronous symbol and a data packet of a data subframe according to FIG. 21.

FIG. 21 is a graph showing intervals of FFT peaks according to another embodiment of the present invention, and FIG. 22 is an exemplary view showing frequencies allocated according to bit values of an asynchronous symbol and a data packet of a data subframe according to FIG. 21.

Like the example of FIGS. 19 and 20, $\Delta FFT_{peak}$ is also obtained in another example of FIGS. 21 and 22. FIGS. 21 and 22 show an example in which $\Delta FFT_{peak}$ is 1. If the maximum number Nf of frequency allocated channels is obtained in the same principle, it is 71. Accordingly, the M-FSK coding unit 115 selects frequencies less than seventy-one according to bit values of an asynchronous symbol and a data packet configuring a data subframe and allocates a frequency between f1 and f64 according to the preset M-FSK coding table shown in FIG. 23. In the example of FIG. 22, since the data packet is five-bit long and thus there are six bits in total including the asynchronous symbol, sixty-four frequencies are allocated.

Figure 23:
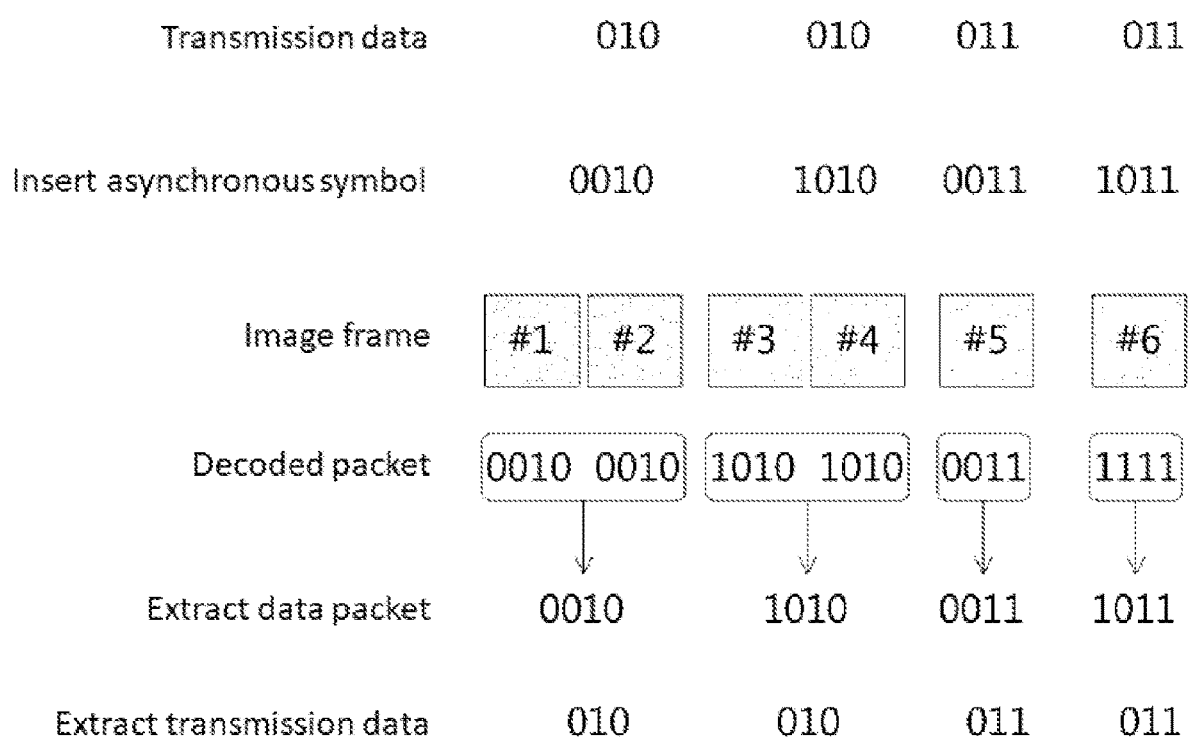
FIG. 23 is a conceptual view schematically showing the process of transmitting and receiving data in an image sensor communication system according to an embodiment of the present invention.

FIG. 23 is a conceptual view schematically showing the process of transmitting and receiving data in an image sensor communication system according to an embodiment of the present invention.

Referring to FIG. 23, in an image sensor communication system 100 according to an embodiment of the present invention, first, a data packet is configured by inserting an asynchronous symbol at the front end of a transmission data to be transmitted. The LED is turned on/off according to the data packet, and the image sensor 131 included in the rolling shutter camera 130 extracts on/off images of the LED 120. At this point, since the frame rate of the image sensor 131 varies, the number of captured image frames may be different at each clock as shown in the example of FIG. 11. Accordingly, asynchronous symbols 1 and 0 are alternately allocated at each clock.

Then, a data packet is decoded from image frames. This is extracting a data packet corresponding to each image frame. Then, a data packet is extracted for each clock, and a transmission data is extracted by excluding the previously inserted asynchronous symbol from each data packet.

Here, in the present invention, when the LED 120 is turned on/off, a different frequency is allocated according to bit values of a data packet to be transmitted and an asynchronous symbol inserted at the front end of the data packet. An appropriate number of frequencies are determined and allocated as described above with reference to a preset M-FSK coding table.

Figure 24:
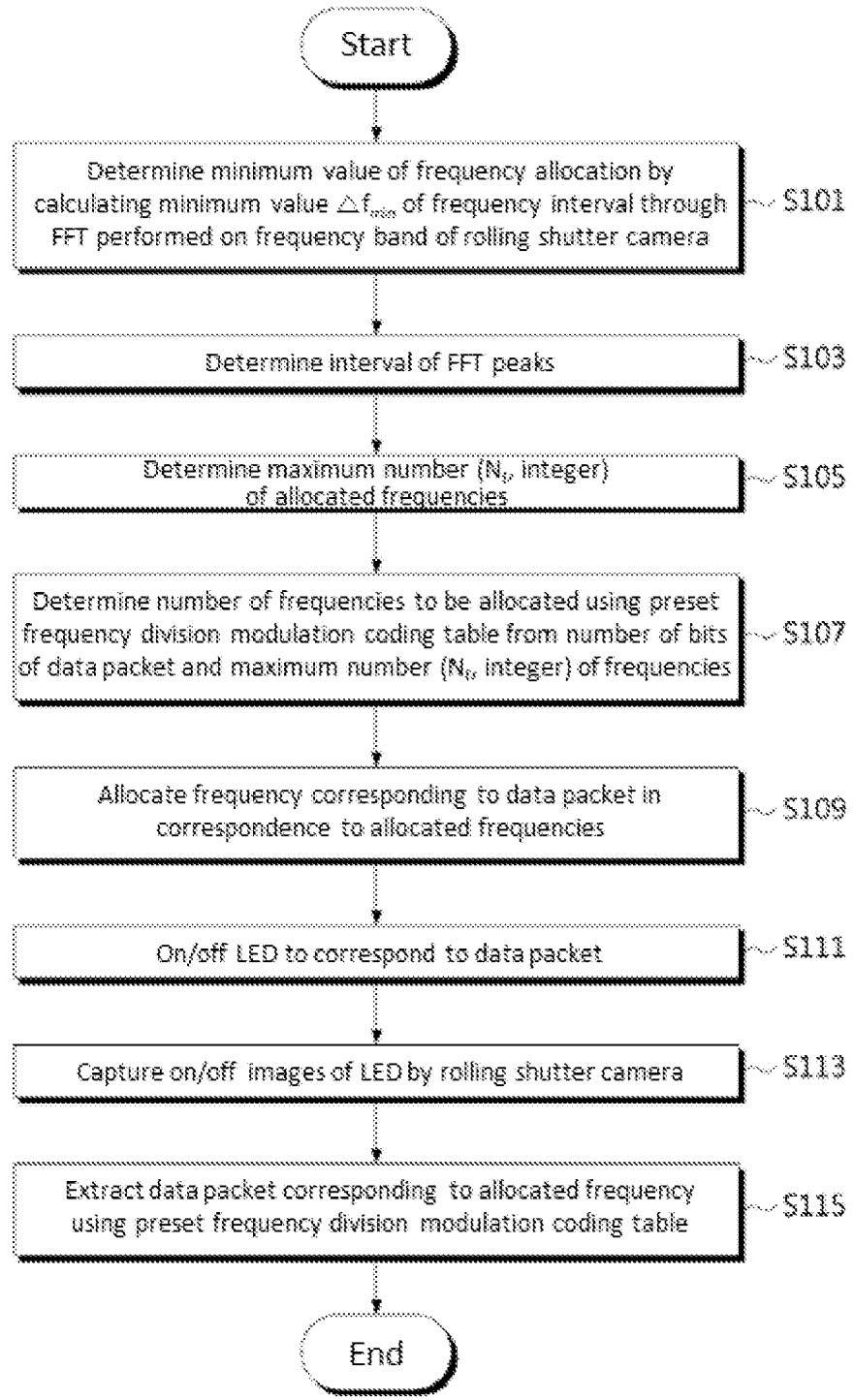
FIG. 24 is a flowchart illustrating an image sensor communication method according to an embodiment of the present invention.

FIG. 24 is a flowchart illustrating an image sensor communication method according to an embodiment of the present invention.

Referring to FIG. 24, in an image sensor communication method according to the present invention, a frequency modulation unit 111 of the LED driving unit 110 calculates a minimum value $\Delta f_{min}$ of the frequency interval through FFT performed on the frequency band of the rolling shutter camera 130 for frequency allocation corresponding to a data packet (step S401). The minimum value $\Delta f_{min}$ calculated like this becomes the minimum value of frequency allocation. If the frequency allocation is determined like this, an interval $\Delta FFT_{peak}$ of FFT peaks of at least 1 is determined (step S403). Then, if the $\Delta FFT_{peak}$ is determined, the frequency conversion unit 111 determines the maximum number (Nf, an integer) of allocated frequencies (step S405). At this point, the maximum number is determined as an integer satisfying Nf≤(capturing frequency of image sensor of rolling shutter camera)/($\Delta FFT_{peak} \times \Delta f_{min}$) and calculated as shown in mathematical expression 4 described above.

Then, the number of frequencies is determined using the number of bits of the data packet and the maximum number Nf of the frequencies (step S407), and a frequency corresponding to a data packet is allocated using the preset frequency division modulation coding table in accordance to the number of allocated frequencies (step S409). The LED driving unit 110 turns on/off the LED 120 to correspond to the data packet according to the frequency allocated like this (step S411), and the rolling shutter camera 130 captures on/off images of the LED 120 (step S113). The data processing unit 140 extracts a data packet corresponding to each allocated frequency using the preset frequency division modulation coding table (step S415).

Figure 25:
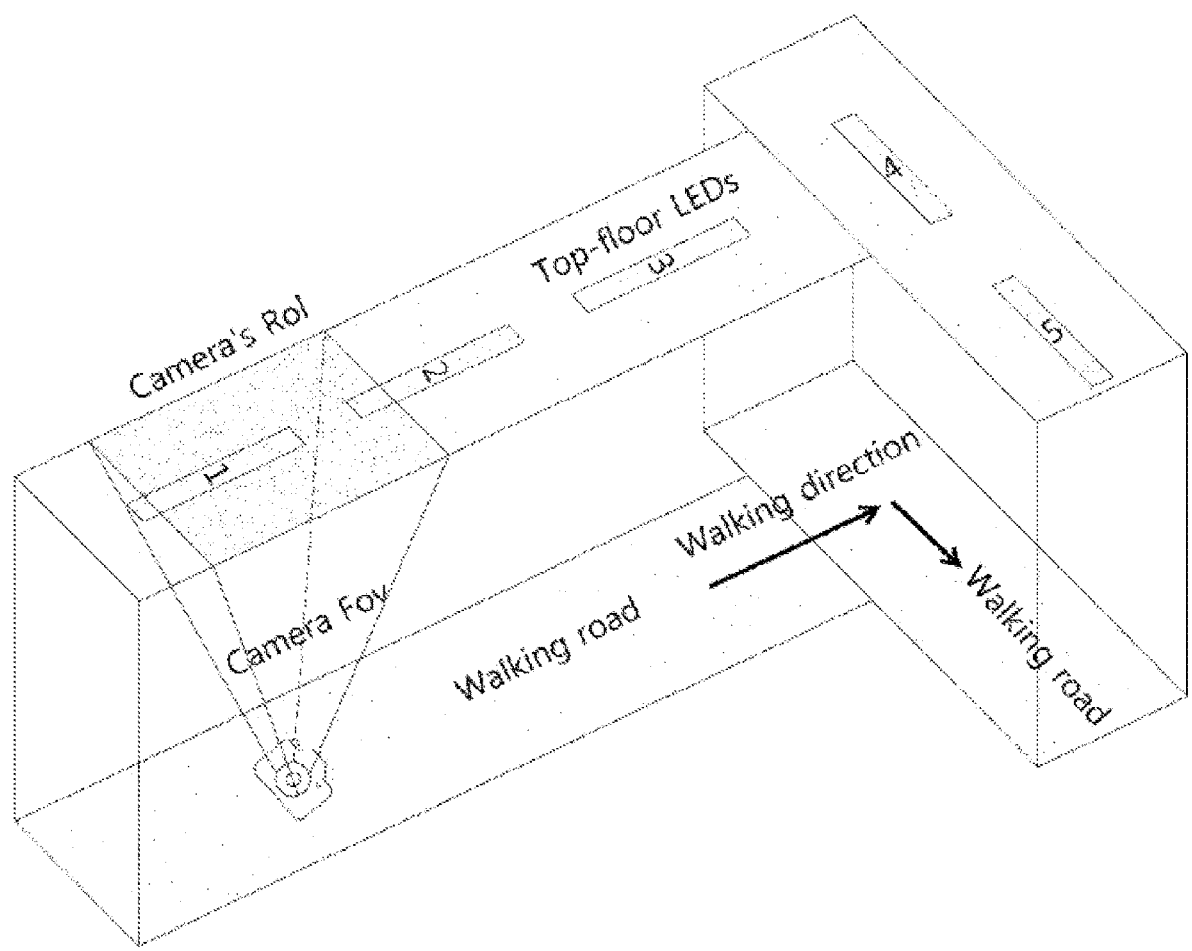
FIGS. 25 and 26 are structural views showing the design and arrangement of LEDs according to an embodiment of the present invention.
Figure 26:
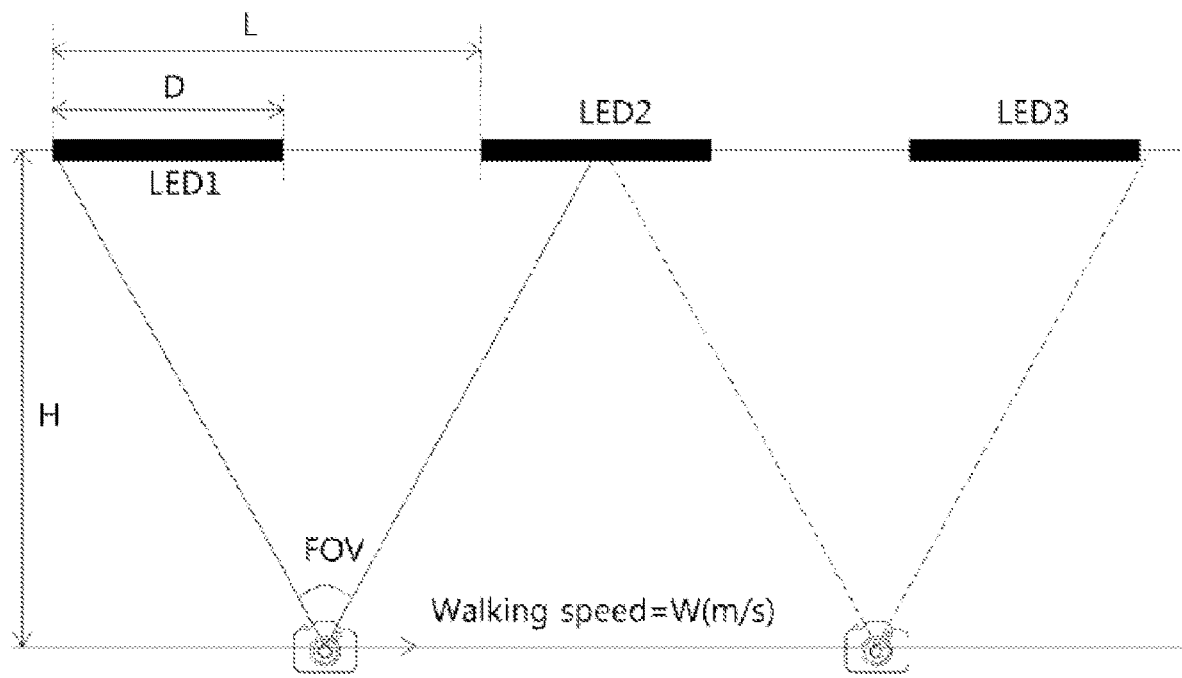

FIGS. 25 and 26 are structural views showing the design and arrangement of LEDs in an image sensor communication compatible to various rolling shutter cameras according to an embodiment of the present invention.

Referring to FIGS. 25 and 26, LEDs 120 according to the present invention are arranged along the moving path of the rolling shutter camera 130. At this point, the LEDs 120 are attached on the ceiling along the moving path of the rolling shutter camera 130 to obtain a maximum height of the LEDs 120 on an image. The rolling shutter camera 130 sequentially photographs on/off images of the LEDs 120 along each row.

In FIG. 25, the distance L between LEDs 130 for movement of a user possessing the rolling shutter camera 130 is as shown below.

$$L \leq 2H \times (FOV/2)$$

The longer the length d is, it is good for communication, but power consumption increases.

For example, when the height of the ceiling (H) on which the LEDs 120 are installed is 2 m, the photographing angle FOV of the rolling shutter camera 130 is 68° and the length of the LED 120 is 1.2 m, the distance L between the LEDs 120 becomes 2.7 m. At this point, the moving speed of the user possessing the rolling shutter camera 130, i.e., the moving speed of the rolling shutter camera 130, is limited by a connection switching algorithm between the LEDs 120.

Figure 27:
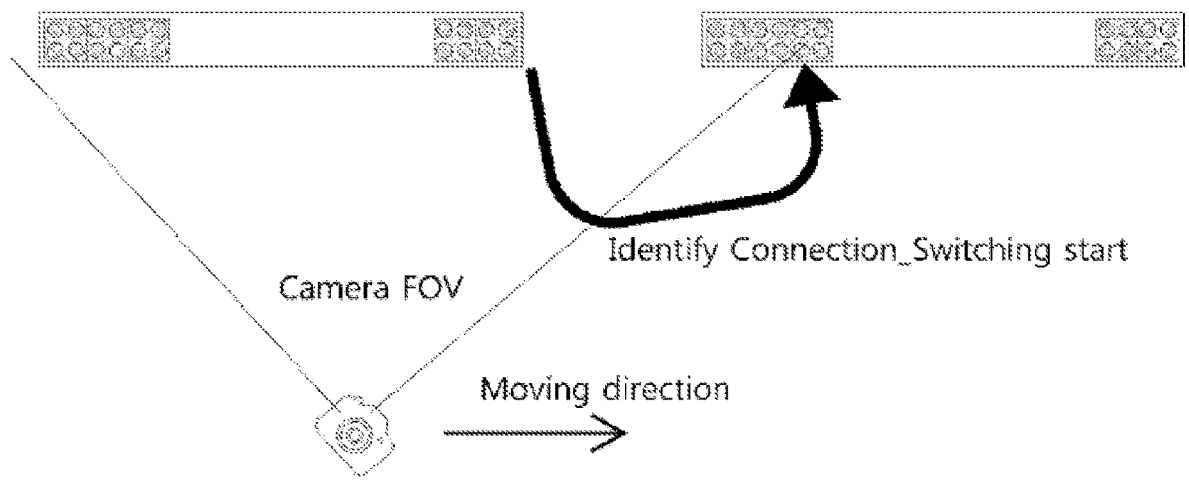
FIG. 27 is a view showing the process of identifying a connected LED by a rolling shutter camera according to the present invention.

FIG. 27 is a view showing the process of identifying a connected LED by a rolling shutter camera according to the present invention.

Referring to FIG. 27, in the present invention, the rolling shutter camera 130 performs communication with a plurality of LEDs 120 while moving along a moving path. At this point, the LEDs 120 are preferably installed on the ceiling of the moving path. At this point, if the plurality of LEDs 120 is continuously connected and the rolling shutter camera 130 communicates while moving, a method of identifying the continuously connected LEDs 120 is required. In this case, a new reference group of a new LED tube is detected as the rolling shutter camera 130 moves, and a priority is granted to an LED according to a moving direction if a plurality of new LED tubes is detected, and connection is switched to a new LED if the length of the new LED tube is larger than the length of the previous LED tube. Therefore, switching is progressed to the LED of the new LED tube.

Figure 28:
FIG. 28 is a view showing the structure of an M-FSK data frame for compatibility of a rolling shutter camera according to an embodiment of the present invention.

FIG. 28 is a view showing the structure of an M-FSK data frame for compatibility of a rolling shutter camera according to an embodiment of the present invention.

Referring to FIG. 28, an M-FSK data frame according to the present invention is configured of a compatibility-supporting-packet 31 and a data packet 32. Each rolling shutter camera 130 has a different frame rate and a different sampling rate. Therefore, the present invention provides these various rolling shutter cameras 130 with compatibility using a data frame structure having a frame which supports compatibility. All the LEDs 120 transmit some packets for supporting the various rolling shutter cameras 130 when a data is decoded. These packets support compatibility and have the features described below.

First, the compatibility-supporting-packet 31 allows the rolling shutter camera 130, which is a receiver, to identify its sampling rate (KHz). An identification value of the sampling rate is stored and used when next data packets are decoded. Second, the compatibility-supporting-packet 31 allows the rolling shutter camera 130 to confirm whether its own variable frame rate satisfies communication conditions. If the communication conditions are not satisfied, this is informed to the user, and an error is generated.

Figure 29:
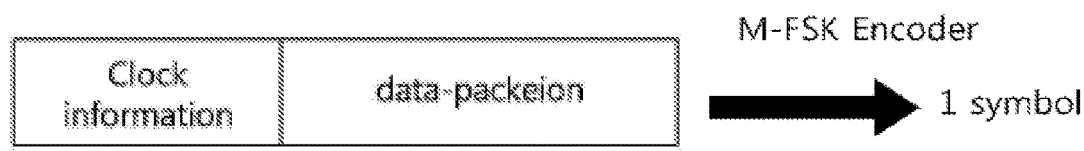
FIG. 29 is a view showing the configuration of a compatible symbol of M-FSK coding according to the present invention.

FIG. 29 is a view showing the configuration of a compatible symbol of M-FSK coding according to the present invention.

Referring to FIG. 28, in the case of M-FSK encoding according to an embodiment of the present invention, clock information and a data packet are set as one symbol. That is, a data packet having its own clock information before encoding is set as one symbol. Here, the clock information is configured of an asynchronous bit. Therefore, if a data packet+clock information (an asynchronous bit) are input, one symbol is output. Here, the number of bits per symbol Number_of_bits symbol is expressed as shown below.

$$\text{Number\_of\_bits\_symbol} = \log_2(\text{Bandwidth}/\text{Frequency Separation})$$

For example, when the bandwidth between 200 Hz and 2.3 KHz and the frequency separation is 32.192 KHz, the number of bits per symbol is six, and when the frequency separation is 96.576 KHz, the number of bits per symbol is four.

The period of a symbol according to the present invention should be defined as described below.

First, the period of a symbol should be sufficiently long to perform a majority decision method to minimize the error, and second, the period of a frame configured of a plurality of symbols should be sufficiently short as shown in the table so that a moving user may decode the data and an LED 120 is identified for localization.

TABLE 1

| 1 symbol | >3 images |
|---|---|
| 1 second | <30 images |
| 1 second | <10 symbols |
| 0.675 s (2 m/s) | 1.35 s (1 m/s) |
| 6.75 symbols | 13.5 symbols |

Meanwhile, when the LEDs 120 according to the present invention are installed to be distributed in several areas, the rolling shutter camera 130 needs to confirm identification information ID for identifying a corresponding area to perform communication with an LED 120. At this point, the LED 120 transmits data packets in a broadcasting method.

At this point, the user should download in advance a map of a building in which each of a plurality of LEDs 120 is defined by different identification information ID. In addition, the rolling shutter camera 130 recognizes identification information ID of a LOS-LED while the user is moving and finally calculates the location of the user after mapping the LEDs 120 onto the map downloaded in advance.

Describing specifically, first, the user downloads a map at the entrance door using a wireless communication method and performs user registration. Subsequently, identification information ID is transmitted from the LED 120 to the rolling shutter camera 130 through broadcasting communication. At this point, compatibility for various types of rolling shutter cameras 130 is supported through the frame structure described above. Subsequently, the LED 120 is mapped to a virtual map after the ID of the LED 120 is identified, and location of the user is calculated using a location-based-service (LBS) algorithm.

Figure 30:
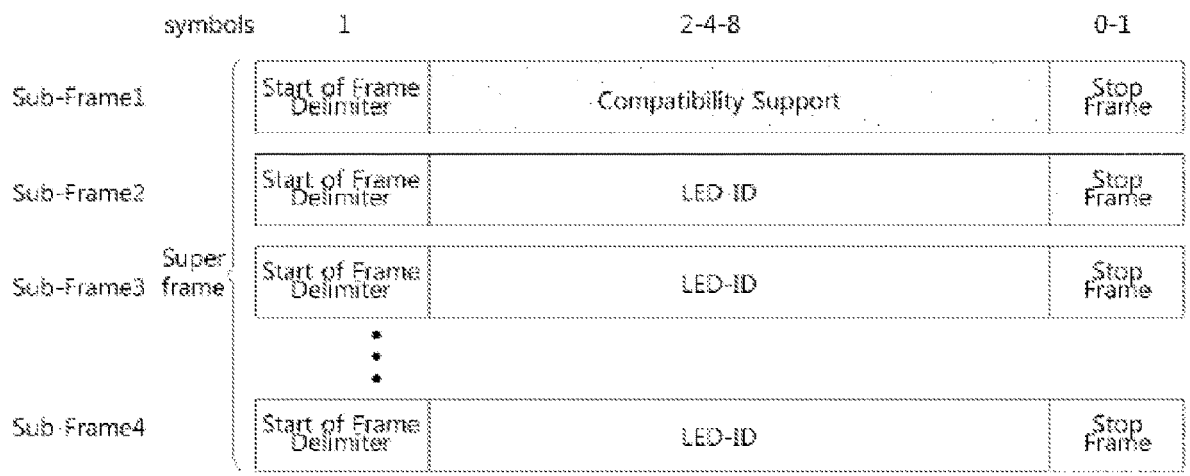
FIG. 30 is a view showing the structure of an ID broadcasting frame having a compatibility-supporting-subframe according to the present invention.

FIG. 30 is a view showing the structure of an ID broadcasting frame having a compatibility-supporting-subframe according to the present invention.

Referring to FIG. 30, the compatibility-supporting-subframe according to the present invention allows the rolling shutter camera 140 to identify its sampling rate (KHz). The identification value of the sampling rate is stored and used to decode next data packets. In addition, the compatibility-supporting-subframe allows the rolling shutter camera 130 to confirm whether its own variable frame rate satisfies communication conditions. If the communication conditions are not satisfied, this is informed to the user, and an error is generated.

In the present invention, it is assumed that two symbols equal to one byte (the symbol is defined as five bits including an asynchronous bit due to the restriction on the bandwidth), and the number of LEDs of a building is determined according to how many bytes are used for an ID packet. For example, 255 LEDs are supported if one byte is used for the ID, 65535 LEDs are supported if two bytes are used for the ID, and $2^{32}-1$ LEDs are supported if four bytes are used for the ID.

Figure 31:
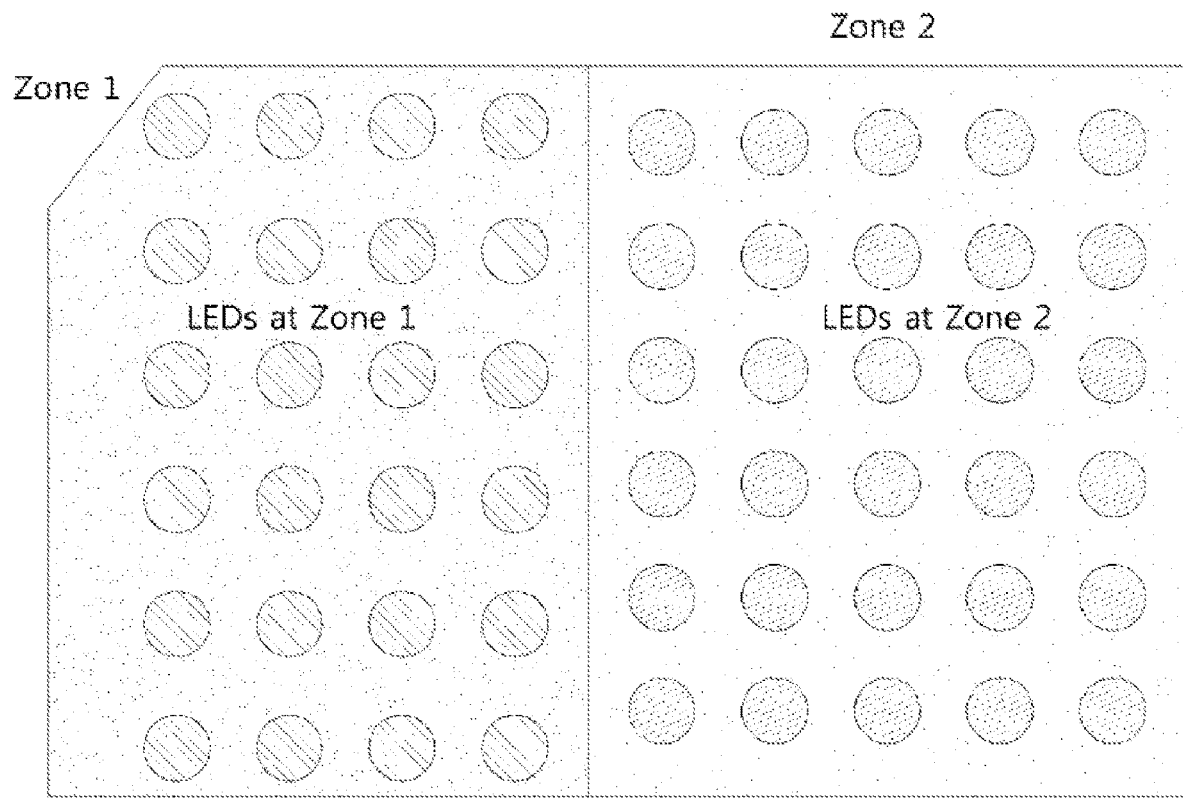
FIG. 31 is an exemplary view showing arrangement of a plurality of LEDs according to the present invention.

FIG. 31 is an exemplary view showing arrangement of a plurality of LEDs according to the present invention.

Referring to FIG. 31, a plurality of LEDs 120 according to the present invention is arranged in a plurality of zones. Zone-specific IDs distinguished from each other are allocated in a first zone (zone 1) and a second zone (zone 2).

Figure 32:
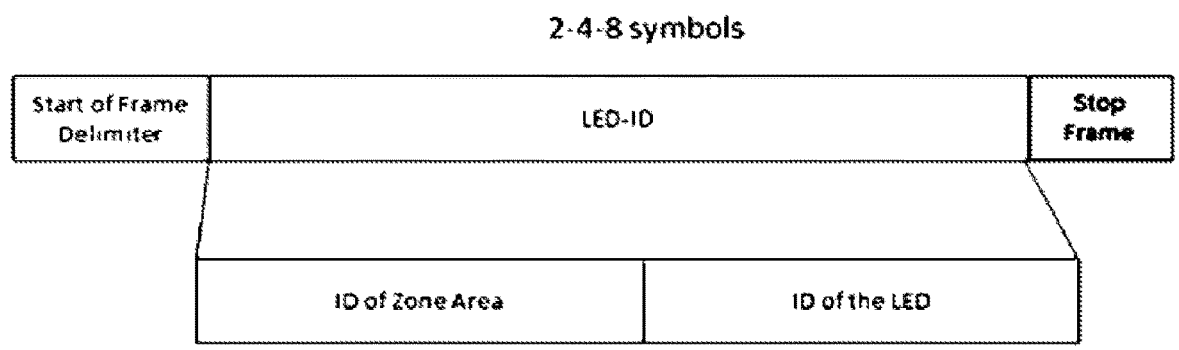
FIG. 32 is a view showing the structure of an ID broadcasting frame having a zone-specific ID.
Figures 33, 34, 35:
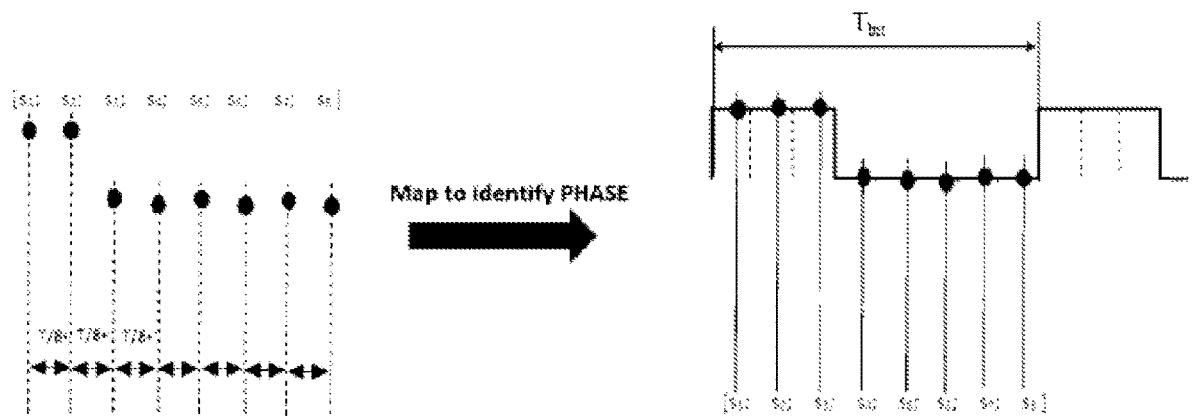
FIG. 33 is an example showing the structure of an ID frame for two zones.
FIG. 34 is a view showing the structure of a data frame having a compatibility-supporting-subframe according to an embodiment of the present invention.
FIG. 35 is a view showing a mapping process for generating a discrete waveform and detecting a phase and a dimming level according to an embodiment of the present invention.

Accordingly, an ID of a zone and an ID of a corresponding LED are allocated to each LED. This is configuring an ID frame structure for expressing an ID of each LED to include an ID of a specific zone and an ID of a specific LED as shown in FIGS. 32 and 33 when there are many LEDs in a building. FIG. 32 is a view showing the structure of an ID broadcasting frame having a zone-specific ID, and FIG. 33 is an example showing the structure of an ID frame for two zones. The ratio of the zone ID to the LED ID is determined according to the number of zones and the number of LEDs. If the number of zones is the smaller, the length of the zone ID should be the shorter.

FIG. 34 is a view showing the structures of a data frame having a compatibility-supporting-subframe according to an embodiment of the present invention.

Referring to FIG. 34, a data frame having a compatibility-supporting-subframe according to the present invention is configured of a plurality of subframes, and a first subframe (subframe 1) is configured of a start frame (Start of Frame), an LED-ID, a Length, a compatibility-supporting-packet and a Stop Frame, and starting from a second subframe following the first subframe, a subframe is configured of a Start Frame, an LED-ID, a Length, a data frame and a Stop Frame. At this point, two symbols correspond to an ID of one byte for 125 LEDs. The length of the subframe should be determined considering movement of the user. If the length is too long, a time required in the process of changing LEDs, as well as the speed of the user, becomes an important factor for determining the length of a data subframe.

Hereinafter, a dimmable M-PSK technique will be described using dimmable 8-PSK according to an embodiment of the present invention.

A MIMO LED-transmitter is configured of many LED groups. Each LED group is 8-LED and configured together. It is assumed that there are two type of LED groups. One is a reference group for transmitting a reference signal, and the other is a data group for transmitting data. Since LEDs of each group are synchronized with each other, if the first LED is delayed as much as T/8 periods, the other LEDS are also delayed by T/8 periods. Signals from the LEDs are changed together over time, and this is referred to as a Phase_Shift value. A signal for controlling an LED is a dimmed square signal. That is, it is a dimmed On-Off Keying (OOK) signal. The Phase_Shift value of the reference group does not change at 0. The Phase_Shift value of the data group changes to transmit data.

Signal transmission of a group according to time variable t is expressed as shown in mathematical expression 5, and a received state of an LED at a specific time value t0 is expressed as shown in mathematical expression 6.

Mathematical expression 5

$$\begin{cases} x_1 = \text{Dimmed\_square}(t) \\ x_2 = \text{Dimmed\_square}\left(t + \frac{1T}{8}\right) \\ x_3 = \text{Dimmed\_square}\left(t + \frac{2T}{8}\right) \\ x_8 = \text{Dimmed\_square}\left(t + \frac{7T}{8}\right) \end{cases} \quad \text{[Equation 5]}$$

Mathematical expression 6

$$\begin{cases} s_1 = \text{Dimmed\_square}(t_0) \\ s_2 = \text{Dimmed\_square}\left(t_0 + \frac{1T}{8}\right) \\ s_3 = \text{Dimmed\_square}\left(t_0 + \frac{2T}{8}\right) \\ s_8 = \text{Dimmed\_square}\left(t_0 + \frac{7T}{8}\right) \end{cases} \quad \text{[Equation 6]}$$

Like this, a non-continuous waveform is generated and a phase of a group is detected through a received 8-state of the 8-LED in the group. An example of the discrete waveform is shown in FIG. 2.

FIG. 35 is a view showing a mapping process for generating a discrete waveform and detecting a phase and a dimming level according to an embodiment of the present invention.

Referring to FIG. 35, a process of acquiring a sampled state of 4-LED from a group to generate a discrete waveform and mapping the discrete waveform to a decoding table to find a phase in the LED group is performed.

Figure 36:
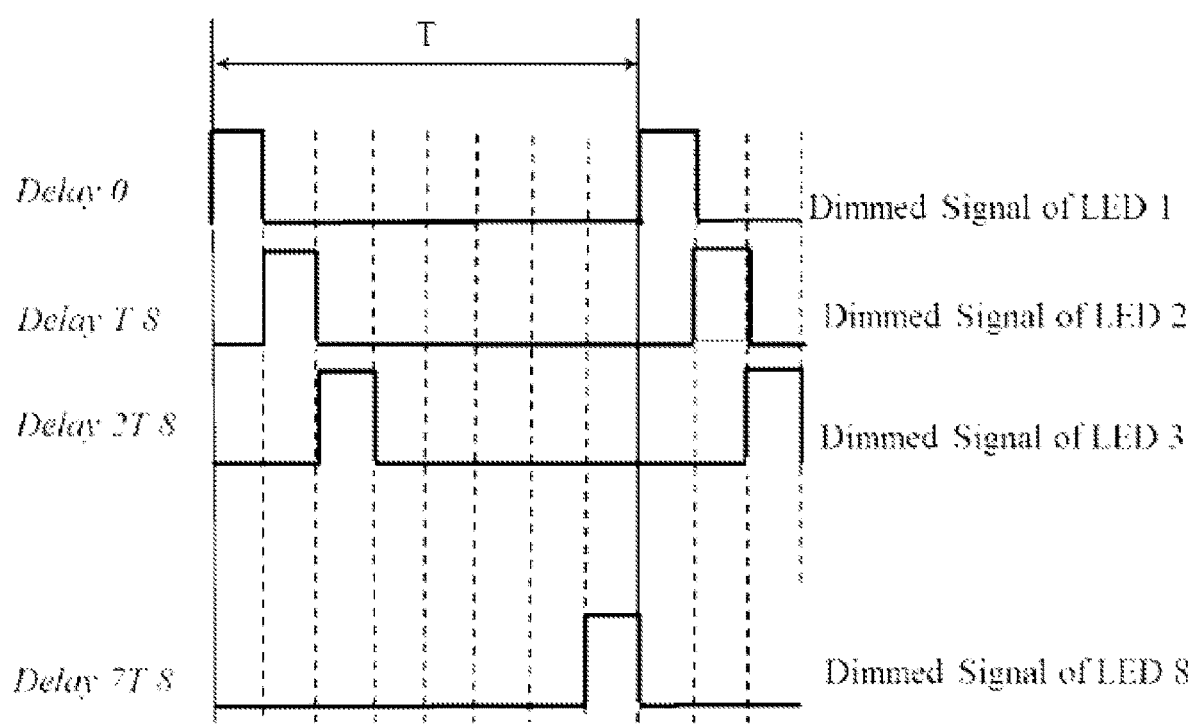
FIG. 36 is a graph showing difference of delay among dimmed signals for controlling LEDs according to the present invention.

FIG. 36 is a graph showing difference of delay among dimmed signals for controlling LEDs according to the present invention.

Referring to FIG. 36, the dimmable M-PSK technique uses M LEDs to transmit a phase of an LED group. For example, in the case of 8-PSK, eight LEDs exists together in a group as shown in FIG. 3. For example, when a group of eight LEDs is used, the phase N is 8, and three bits can be transmitted at each time. At this point, the dimming step is 0.125. Here, the dimming level is AB %=(Σ"1")/8. The 8-state of the LEDs is 10000011, and the dimming level becomes AB %=⅜=37.5%.

An encoding table through phase comparison and a decoding table from the phase D are as shown below.

TABLE 2

Encoding table

| 3-bit input | Phase output |
|---|---|
| 000 | 1 |
| 001 | 2 |
| 010 | 3 |
| 011 | 4 |
| 100 | 5 |
| 101 | 6 |
| 110 | 7 |
| 111 | 8 |

TABLE 3

Encoding table

| D (phase) | 3-bit output |
|---|---|
| 1 | 0001 |
| 2 | 012 |
| 3 | 103 |
| 4 | 114 |
| 5 | 005 |
| 6 | 016 |
| 7 | 107 |
| 8 | 118 |

A dimmed M-PSK decoding algorithm according to an embodiment of the present invention is as described below.

First, a dimming level is detected. The dimming level is AB %=(Σ"1")/8.

Second, the dimming level is mapped to an entry of the phase encoding table. This is determined according to the dimming level. A reference LED of 8 group is decoded to provide a reference phase. A data LED of 8 group is decoded to provide a data phase.

Finally, data packets are decoded from the phase D using the decoding table. Such a phase D may be determined as a value calculated by subtracting the reference phase from the data phase.

A phase decoding table according to T/8 dimmed signals is as shown below.

TABLE 4

| 1/8 Dimmed Signal | | 2/8 Dimmed Signal | | 3/8 Dimmed Signal | | 4/8 Dimmed Signal | |
|---|---|---|---|---|---|---|---|
| 8-State Input | Phase output | 8-State Input | Phase output | 8-State Input | Phase output | 8-State Input | Phase output |
| 1000 0000 | 1 | 1000 0001 | 1 | 1000 0011 | 1 | 1000 0111 | 1 |
| 0100 0000 | 2 | 1100 0000 | 2 | 1100 0001 | 2 | 1100 0011 | 2 |
| 0010 0000 | 3 | 0110 0000 | 3 | 1110 0000 | 3 | 1110 0001 | 3 |
| 0001 0000 | 4 | 0011 0000 | 4 | 0111 0000 | 4 | 1111 0000 | 4 |
| 0000 1000 | 5 | 0001 1000 | 5 | 0011 1000 | 5 | 0111 1000 | 5 |
| 0000 0100 | 6 | 0000 1100 | 6 | 0001 1100 | 6 | 0011 1100 | 6 |
| 0000 0010 | 7 | 0000 0110 | 7 | 0000 1110 | 7 | 0001 1110 | 7 |
| 0000 0001 | 8 | 0000 0011 | 8 | 0000 0111 | 8 | 0000 1111 | 8 |

TABLE 5

| 5/8 Dimmed Signal | | 6/8 Dimmed Signal | | 7/8 Dimmed Signal | |
|---|---|---|---|---|---|
| 8-State Input | Phase output | 8-State Input | Phase output | 8-State Input | Phase output |
| 1000 1111 | 1 | 1001 1111 | 1 | 1011 1111 | 1 |
| 1100 0111 | 2 | 1100 1111 | 2 | 1101 1111 | 2 |
| 1110 0011 | 3 | 1110 0111 | 3 | 1110 1111 | 3 |
| 1111 0001 | 4 | 1111 0011 | 4 | 1111 0111 | 4 |
| 1111 1000 | 5 | 1111 1001 | 5 | 1111 1011 | 5 |
| 0111 1100 | 6 | 1111 1100 | 6 | 1111 1101 | 6 |
| 0011 1110 | 7 | 0111 1110 | 7 | 1111 1110 | 7 |
| 0001 1111 | 8 | 0011 1111 | 8 | 0111 1111 | 8 |

Figure 37:
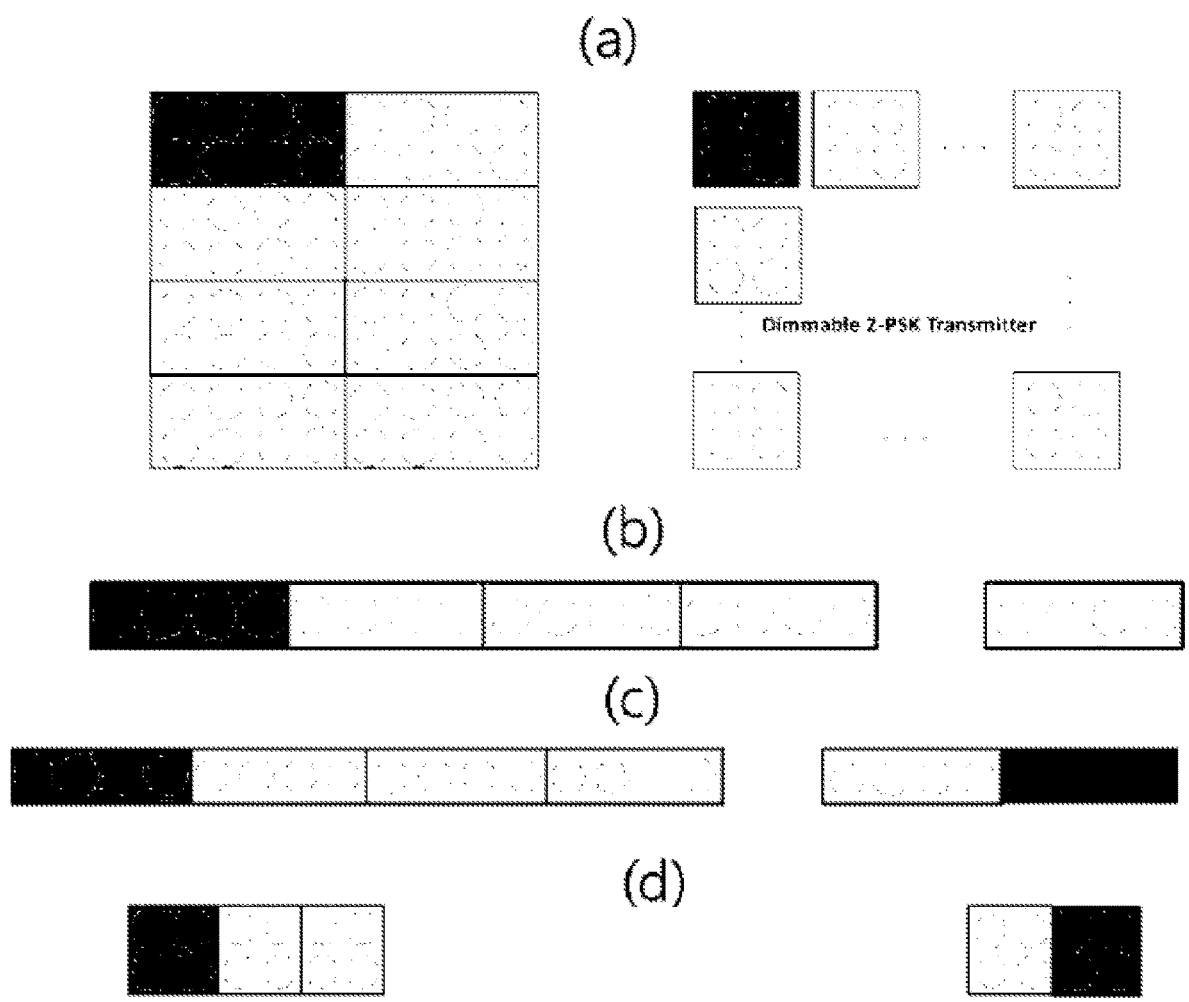
FIG. 37 is an exemplary view showing the design of an LED tube for M-PSK according to an embodiment of the present invention.

FIG. 37 is an exemplary view showing the design of an LED tube for M-PSK according to an embodiment of the present invention.

Referring to FIG. 37, a plurality of LEDs according to the present invention configures one LED tube. This LED tube is implemented for M-PSK as shown in the figure.

The left side of FIG. 37(a) is an exemplary view showing the design of an 8×8 LED transmitter for dimmable 8-PSK, and the right side is an exemplary view showing the design of a dimmable 2-PSK LED transmitter. In addition, FIGS. 4(b) and (C) are exemplary views showing the design of an LED-tube for dimmable 2-PSK, and FIG. 37(d) is an exemplary view showing the design of a two-row LED-tube for dimmable 2-PSK. In the figures, the green color represents data LEDs, and the red color represents the reference LED.

Figure 38:
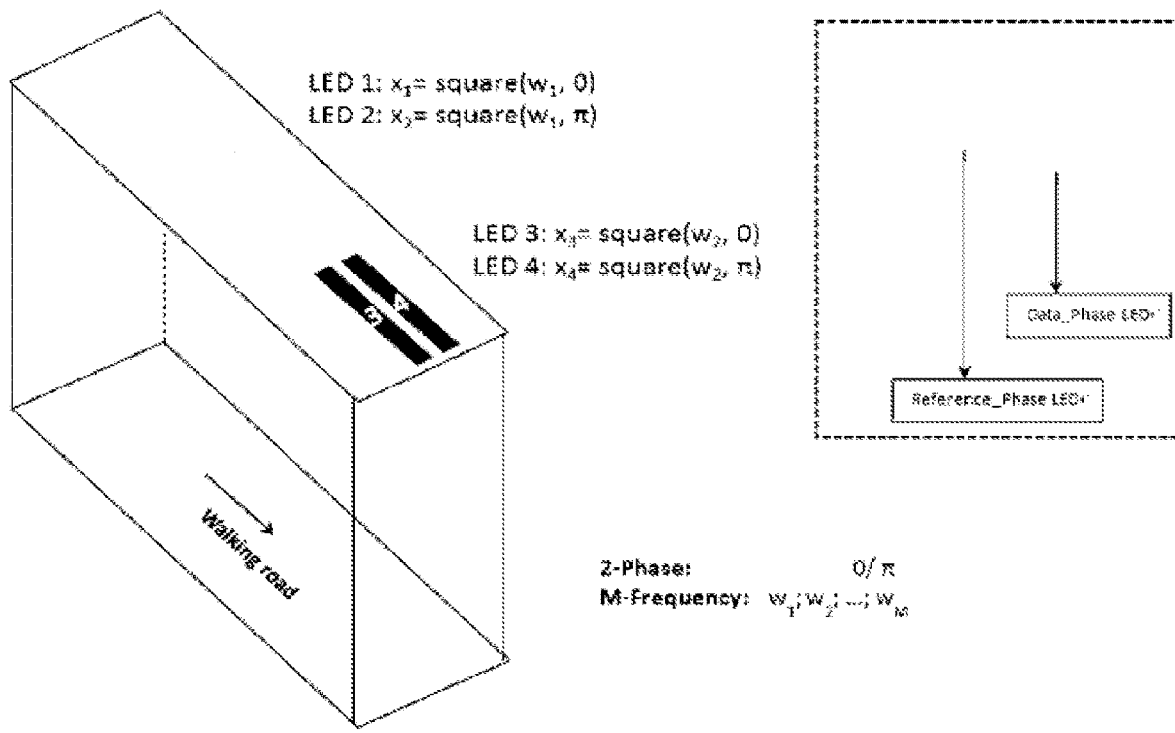
FIG. 38 is an exemplary view showing the design of an LED illumination system of 2-PSK and M-FSK using a dual LED tube according to an embodiment of the present invention.

FIG. 38 is an exemplary view showing the design of an LED illumination system of 2-PSK and M-FSK using a dual LED tube according to an embodiment of the present invention.

Referring to FIG. 38, in the present invention, since the M-FSK may support a plurality of transmitters (LEDs) and frequency allocation is based on the M-FSK to share bands of all LEDs, the M-FSK technique has an advantage of effectively avoiding interference. In addition, the M-FSK effectively supports a rolling shutter receiver, and in addition to the rolling effect, the M-FSK is advantageous in that frequency detection is much easier.

In addition, when M-PSK and M-FSK are compositively used, a data rate several times better than that of using only the M-FSK can be obtained, and there is an advantage of additionally supporting a global shutter receiver.

Mitigation of the rolling effect is complicated. It is since that a receiver has many steps as described below. First, LED location is detected, and a correct LED state is identified, second, a receiving_phase is detected by comparing a reference waveform, and third, a transmission_phase is estimated from the receiving_phase. In the present invention, a draft of a new M-FSK design of a transmitter considering combination of M-PSK and M-FSK is presented to mitigate the rolling effect more simply in a rolling shutter ISC system.

Referring to FIG. 38, one bit can be transmitted by a 2-PSK technique for each 2-LED group set. If two LED groups are in the same phase, the bit may be set to 1, and if the phases are opposite to each other, the bit may be set to 0. The M-FSK technique transmits $\log_2 M$ bits in each period.

Figure 39:
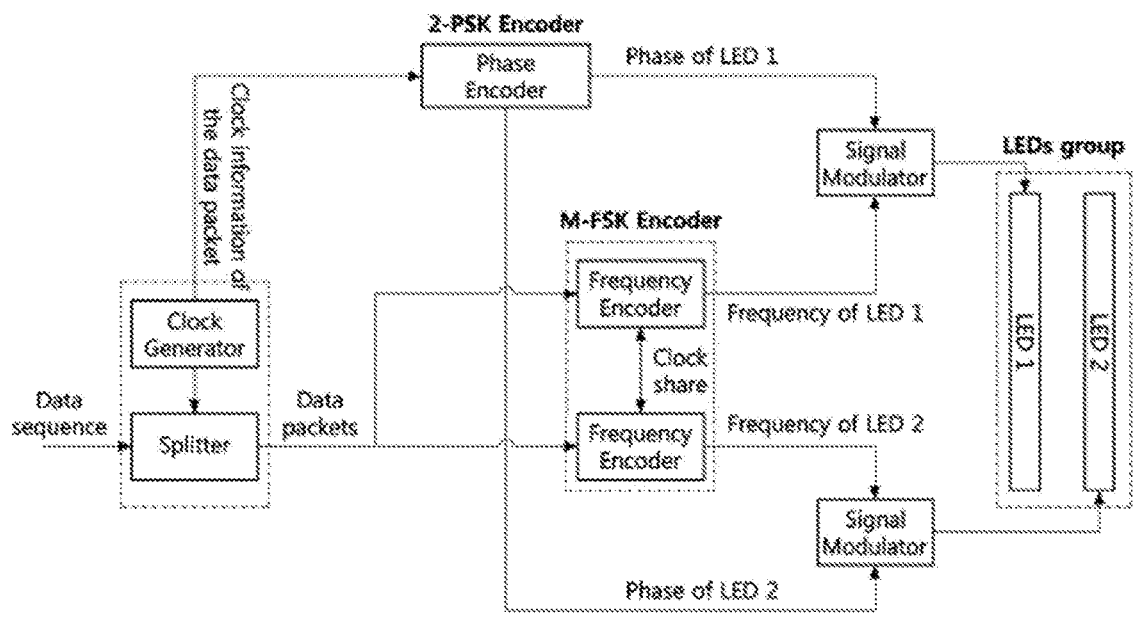
FIG. 39 is a view showing the structure of an LED group receiver using a composite modulation technique of 2-PSK and M-FSK according to an embodiment of the present invention.

FIG. 39 is a view showing the structure of an LED group receiver using a composite modulation technique of 2-PSK and M-FSK according to an embodiment of the present invention.

Referring to FIG. 39, LED 1 and LED 2 transmit together time information of a data packet through a phase using the 2-PSK technique and, in addition, transmit a data through a frequency encoder using the M-FSK technique.

The decoding algorithm of the 2-PSK and the M-FSK is as described below.

First, if a dual LED tube is detected, phases of the two LED tube are compared. If the phases are the same, an asynchronous bit is set to 1, and if the phases are different, the asynchronous bit is set to 0. At this point, the asynchronous bit is time information of a data packet. Then, a common frequency of the dual LED is detected. The data is decoded using the M-FSK.

Figure 40:
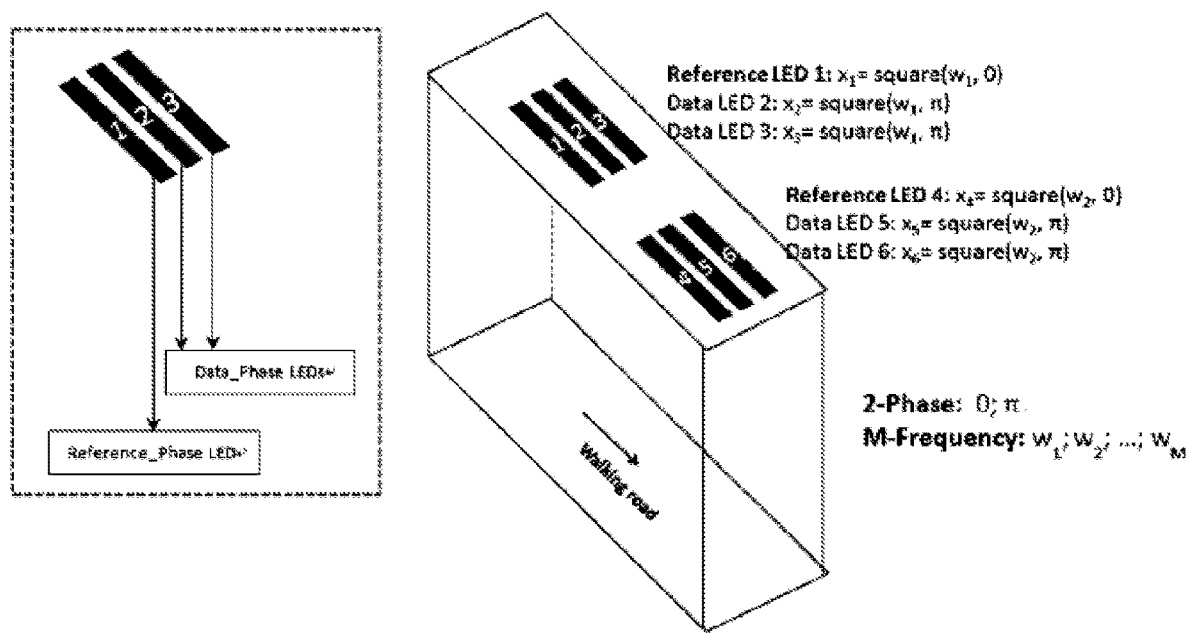
FIG. 40 is an exemplary view showing the design of an LED illumination system of 2-PSK and M-FSK using a 3-LED tube set according to another embodiment of the present invention.
Figure 41:
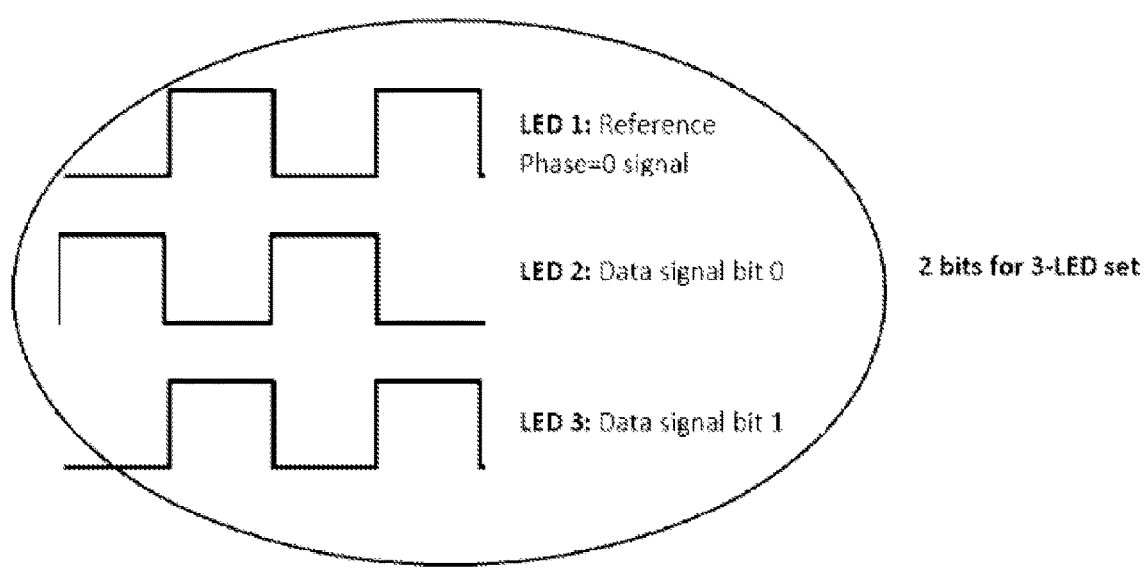
FIG. 41 is a view showing that one of LEDs is used for reference to mitigate the rolling effect in 2-PSK using a 3-LED in FIG. 40.

FIG. 40 is an exemplary view showing the design of an LED illumination system of 2-PSK and M-FSK using a 3-LED tube set according to another embodiment of the present invention.

Referring to FIG. 40, two bits are transmitted per set of a 3-LED group using the 2-PSK technique. One LED is used for reference, and the other two LEDs are used for data (see FIG. 42). If an LED has a phase the same as that of the reference LED, a bit of 1 is transmitted, and if the phases are different from each other, a bit of 0 is transmitted. The M-FSK technique may transmit $\log_2 M$ bits in each period.

Figure 42:
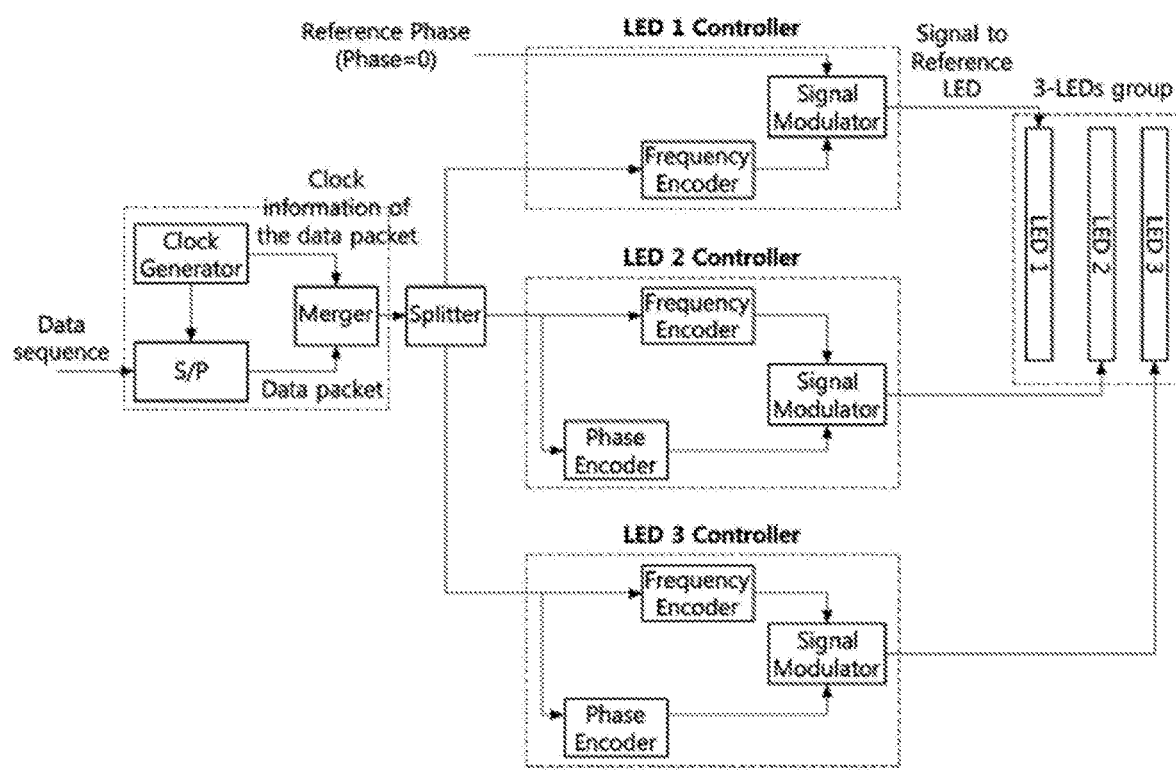
FIG. 42 is a view showing the structure of an LED group receiver using a composite modulation technique of 2-PSK and M-FSK according to an embodiment of the present invention.

FIG. 42 is a view showing the structure of an LED group receiver using a composite modulation technique of 2-PSK and M-FSK according to the present invention. LED 1, LED 2 or LED 3 transmits time information of a data packet. LED 1, which is the reference LED, transmits a reference phase (the phase is always 0) so that a receiver may mitigate the rolling effect in the 2-PSK technique. In addition, LED 1 transmits a data through a frequency like the other two LEDs. LED 2 and LED 3 are data LEDs and transfer information through a phase and a frequency of a signal.

Figure 43:
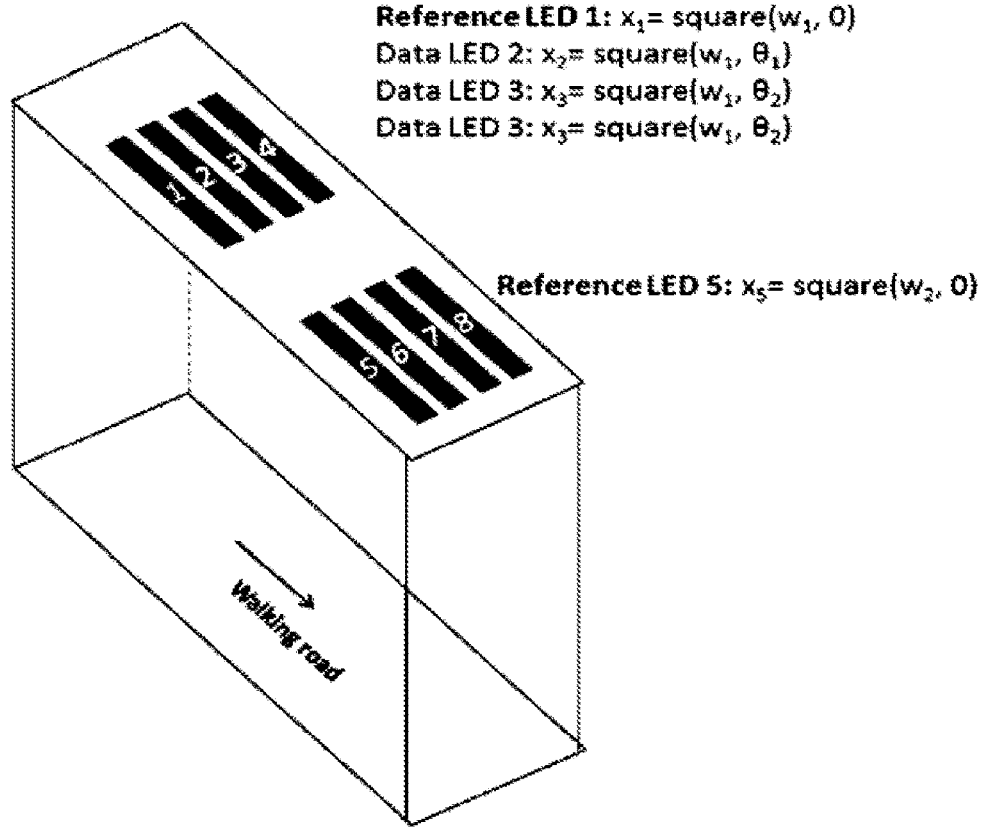
FIG. 43 is an exemplary view showing the design of an LED illumination system for 4-PSK and M-FSK using a 4-LED tube set according to still another embodiment of the present invention.

FIG. 43 is an exemplary view showing the design of an LED illumination system for 4-PSK and M-FSK using a 4-LED tube set according to still another embodiment of the present invention.

Figure 44:
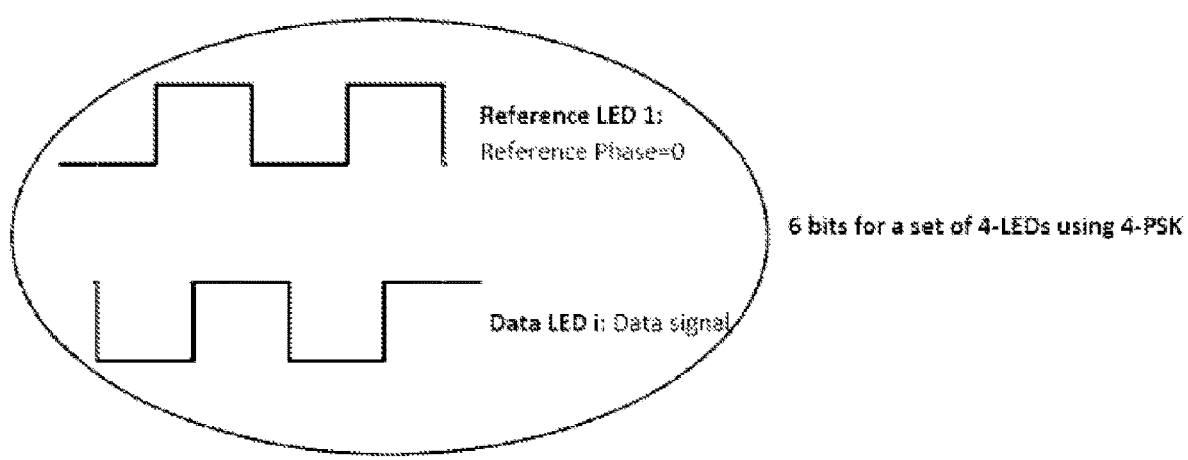
FIG. 44 is a view showing that one of LEDs is used for reference to mitigate the rolling effect in 2-PSK using a 4-LED in FIG. 43.

As shown in the figures, since 2-PSK and M-FSK are used in the present invention, together with a 4-LED tube group, three bits are transmitted per set of a 4-LED group using the 2-PSK technique. At this point, as shown in FIG. 44, one LED is used for reference, and the other three LEDs are used for data. If an LED has a phase same as that of the reference LED, a bit of 1 is transmitted, and if the phases are different from each other, a bit of 0 is transmitted. The M-FSK technique may transmit $\log_2 M$ bits in each period. The 4-PSK transmits two bits/LED like this, and the reference LED helps mitigation of the rolling effect of a receiver. The other three LEDs transmit 2×3=6 bits in total.

Although it is described above that all the components configuring the embodiments of the present invention are integrated or operate in an integrated manner, the present invention is not necessarily limited to the embodiments. That is, within the scope of the present invention, one or more of the components may be selectively combined and operate. In addition, since the terms such as "include", "configure", "have" or the like specified above mean inclusion of a corresponding component as far as an opposed description is not specially specified, it should be interpreted as not excluding another component, but further including another component. Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Since the spirit of the present invention has been disclosed above only for illustrative purposes, those skilled in the art will appreciate that various changes and modifications are possible without departing from the scope and spirit of the present invention. Accordingly, the embodiments disclosed in the present invention are provided not to limit the technical concept of the present invention but to illustrate the technical concept of the present invention. Therefore, the scope of the technical concept of the present invention is not limited by such embodiments. The scope of the protection of the present invention should be interpreted by the appended claims, and all technical concepts coming within the equivalency range of the present invention should be interpreted to be embraced in the scope of the right of the present invention.

The invention claimed is:

1. An operation method performed in a transmitting device including a processor and light emitting diodes (LEDs) in an optical camera communication (OCC) system, the operation method comprising:
generating, by the processor, super-frames #0 to #n; and
transmitting, by the processor, the super-frames #0 to #n to a receiving device by controlling ON/OFF of the LEDs according to data sequences included in the super-frames #0 to #n,
wherein the n is an integer greater than or equal to 1,
each of the super-frames #0 to #n includes a plurality of subframes,
each of the plurality of subframes includes a start frame, a front asynchronous bit, a data packet, and a rear asynchronous bit,
the plurality of subframes, which belong to same super-frame among the super-frames #0 to #n, include same data packet,
a front asynchronous bit #m, included in a super-frame #m among the super-frames #0 to #n, is identical to a rear asynchronous bit #m included in the super-frame #m, and
the m is one among 0 to n,
the front asynchronous bits and the rear asynchronous bits included in the same super-frame are used for distinguishing the data packet, and
the front asynchronous bits and the rear asynchronous bits inserted in the plurality of subframes belonging to the same super-frame are identical.

2. The operation method of claim 1, wherein the front asynchronous bit #m included in the super-frame #m is different from a front asynchronous bit #1 or a rear asynchronous bit #1 included in a super-frame #1 among the super-frames #0 to #n, the 1 is one among 0 to n, and the 1 is different from the m,
wherein the m is odd and the 1 is even, or the m is even and the 1 is odd.

3. The operation method of claim 1, wherein each of the front asynchronous bit and the rear asynchronous bit is one bit.

4. The operation method of claim 1, wherein the super-frames #0 to #n are modulated using a frequency division modulation (FDM) manner, a phase shift keying (PSK) manner, or a frequency shift keying (FSK) manner.

5. The operation method claim 1, wherein the front asynchronous bit and the rear asynchronous bit are used for identifying a specific super-frame to which a specific subframe including the front asynchronous bit and the rear asynchronous bit belongs.

6. The operation method of claim 1, wherein the start frame is used for informing initiation of a specific subframe in which the start frame is included.

7. An operation method performed in a receiving device including a processor in an optical camera communication (OCC) system, the operation method comprising:
receiving, by the processor, super-frames #0 to #n each of which includes a plurality of subframes from a transmitting device;
obtaining, by the processor, a subframe #p among the plurality of subframes included in the super-frames #0 to #n;
obtaining, by the processor, a subframe #(p+1) among the plurality of subframes included in the super-frames #0 to #n;
when a rear asynchronous bit #p included in the subframe #p is identical to a front asynchronous bit #(p+1) included in the subframe #(p+1), restoring, by the processor, a specific data packet by combining a data packet #p included in the subframe #p with a data packet #(p+1) included in the subframe #(p+1),
wherein the n is an integer greater than or equal to 1, and the p is an integer greater than or equal to 0, wherein each of the plurality of subframes includes a start frame, a front asynchronous bit, a data packet, and a rear asynchronous bit, the plurality of subframes which belong to same super-frame among the super-frames #0 to #n include same data packet, each of the super-frames #0 to #n includes different data packet, the front asynchronous bit included in a super-frame #m among the super-frames #0 to #n is identical to the rear asynchronous bit included in the super-frame #m, the m is one among 0 to n, and the front asynchronous bits and the rear asynchronous bits inserted in the plurality of subframes belonging to the same super-frame are identical.

8. The operation method of claim 7, wherein the front asynchronous bit included in the super-frame #m is different from a front asynchronous bit included in a super-frame #1 among the super-frames #0 to #n, the 1 is one among 0 to n, and the 1 is different from the m, wherein the m is odd and the 1 is even, or the m is even and the 1 is odd.

9. The operation method of claim 7, wherein each of the front asynchronous bit and the rear asynchronous bit is one bit.

10. The operation method claim 7, wherein the front asynchronous bit and the rear asynchronous bit are used for identifying a specific super-frame to which a specific subframe including the front asynchronous bit and the rear asynchronous bit belongs.

11. The operation method of claim 7, wherein the start frame is used for informing initiation of a specific subframe in which the start frame is included.

12. The operation method of claim 7, wherein the super-frames #0 to #n are demodulated using a frequency division modulation (FDM) manner, a phase shift keying (PSK) manner, or a frequency shift keying (FSK) manner.

* * * * *